United States Patent
Toyoda et al.

(10) Patent No.: US 10,677,564 B2
(45) Date of Patent: Jun. 9, 2020

(54) TARGET ASSIGNMENT SYSTEM, COMMAND SYSTEM, AND TARGET ASSIGNMENT METHOD

(71) Applicant: MITSUBISHI HEAVY INDUSTRIES, LTD., Tokyo (JP)

(72) Inventors: Yasuhiro Toyoda, Tokyo (JP); Keisuke Ando, Tokyo (JP); Shunsuke Araki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 295 days.

(21) Appl. No.: 15/896,787

(22) Filed: Feb. 14, 2018

(65) Prior Publication Data

US 2019/0093988 A1   Mar. 28, 2019

(30) Foreign Application Priority Data

Sep. 27, 2017   (JP) ................ 2017-187060

(51) Int. Cl.
*F41G 7/22* (2006.01)
*G01S 13/88* (2006.01)
(Continued)

(52) U.S. Cl.
CPC .......... *F41G 7/2233* (2013.01); *F41G 3/04* (2013.01); *F41G 3/165* (2013.01); *F41G 7/007* (2013.01);
(Continued)

(58) Field of Classification Search
CPC .......... F41G 7/2233; F41G 3/165; F41G 3/04; F41G 7/2206; F41G 7/2286;
(Continued)

(56) References Cited

U.S. PATENT DOCUMENTS

| | | | | |
|---|---|---|---|---|
| 4,848,208 A | * | 7/1989 | Kosman | F41G 7/2233 89/1.11 |
| 5,153,366 A | * | 10/1992 | Lucas | F41G 7/007 89/1.11 |

(Continued)

FOREIGN PATENT DOCUMENTS

| | | | | |
|---|---|---|---|---|
| EP | 0431892 A2 | * | 6/1991 | ............... G01S 7/30 |
| EP | 2239533 A1 | * | 10/2010 | ............... F41G 3/04 |

(Continued)

*Primary Examiner* — Bernarr E Gregory
(74) *Attorney, Agent, or Firm* — Wenderoth, Lind & Ponack, L.L.P.

(57) ABSTRACT

A target assignment system includes a sensor system which detects a position of a moving vehicle, an assigning section which determines the launcher system assigned with the moving vehicle in response to the position of the moving vehicle and generates a first display signal which shows the moving vehicle and a first launcher system, a display section which displays the moving vehicle and the assigned launcher system in real time in response to the display signal, and an input section which instructs a change of the assigned launcher system. The assigning section generates a second display signal in which the first launcher system is changed to a second launcher system, in response to an instruction of assignment change.

12 Claims, 38 Drawing Sheets

(51) Int. Cl.
*F41G 3/16* (2006.01)
*F41G 3/04* (2006.01)
*F41G 7/00* (2006.01)
*G01S 13/58* (2006.01)
*G01S 13/42* (2006.01)
*G01S 13/00* (2006.01)
*G01S 7/00* (2006.01)

(52) U.S. Cl.
CPC ......... *F41G 7/2206* (2013.01); *F41G 7/2226* (2013.01); *F41G 7/2286* (2013.01); *G01S 13/883* (2013.01); *G01S 7/003* (2013.01); *G01S 13/42* (2013.01); *G01S 13/589* (2013.01)

(58) Field of Classification Search
CPC ...... F41G 7/2226; F41G 7/007; G01S 13/883; G01S 13/589; G01S 7/003; G01S 13/42
USPC ................................... 89/1.1, 1.11
See application file for complete search history.

(56) References Cited

U.S. PATENT DOCUMENTS

| | | | | |
|---|---|---|---|---|
| 5,206,452 A | * | 4/1993 | Stamper | F41G 3/04 244/3.14 |
| 5,992,288 A | * | 11/1999 | Barnes | F41G 3/04 700/28 |
| 6,196,496 B1 | * | 3/2001 | Moskovitz | F41G 3/04 244/3.11 |
| 6,467,388 B1 | * | 10/2002 | Malakatas | F41G 3/04 235/411 |
| 6,497,169 B1 | * | 12/2002 | Khosla | F41G 3/04 702/144 |
| 7,047,861 B2 | * | 5/2006 | Solomon | B64C 39/024 318/568.12 |
| 8,487,226 B2 | * | 7/2013 | Biswell | F41G 3/04 244/3.1 |
| 9,779,185 B2 | * | 10/2017 | Yuksel Ergun | F41G 3/04 |
| 2007/0244673 A1 | * | 10/2007 | Khosla | F41G 3/04 703/2 |
| 2012/0000349 A1 | * | 1/2012 | Couronneau | F41G 3/04 89/1.11 |

FOREIGN PATENT DOCUMENTS

| | | | | |
|---|---|---|---|---|
| JP | | 3013726 | 2/2000 | |
| WO | WO2010/112907 A1 | * | 10/2010 | ............... F41G 3/04 |

\* cited by examiner

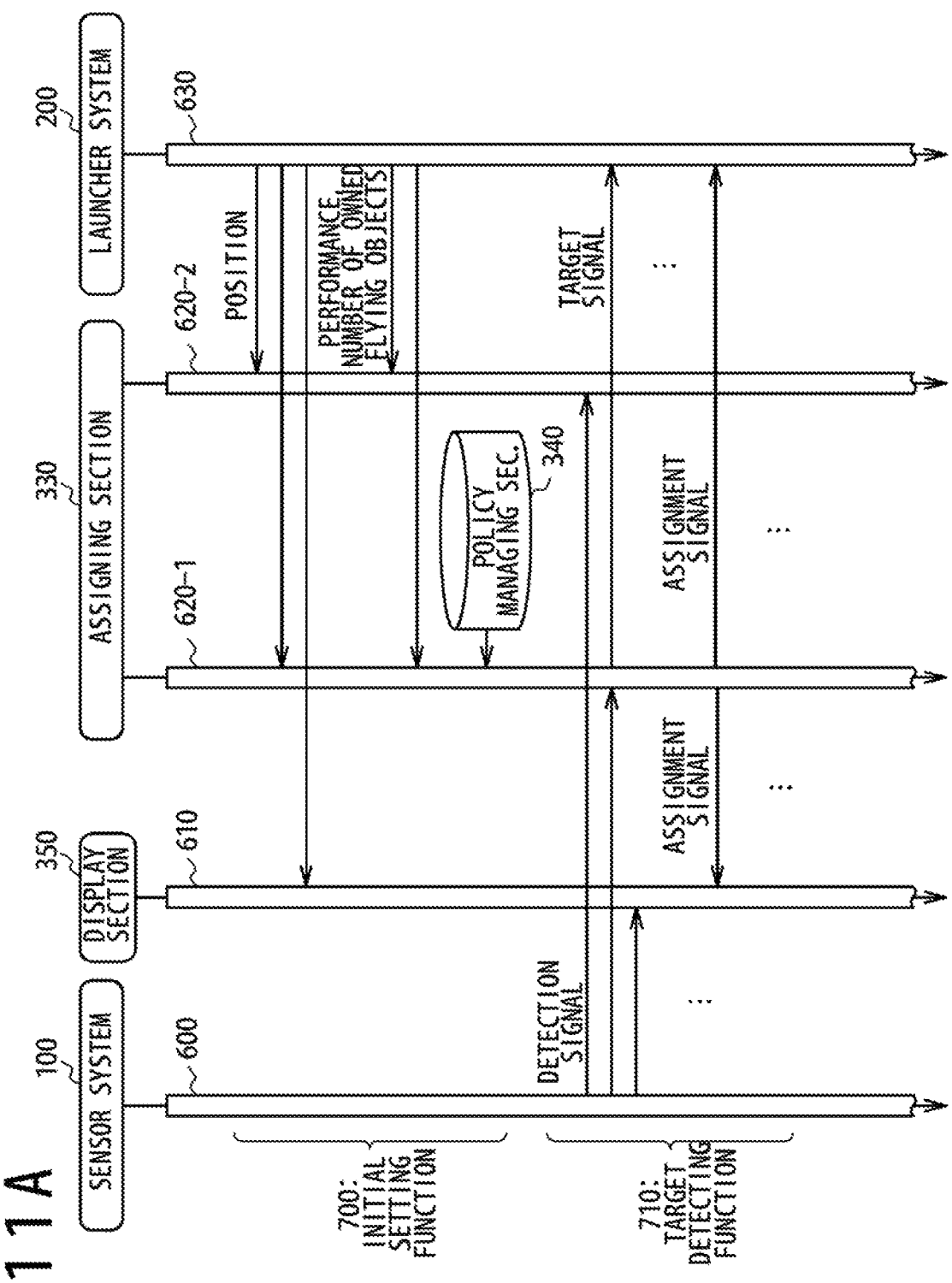

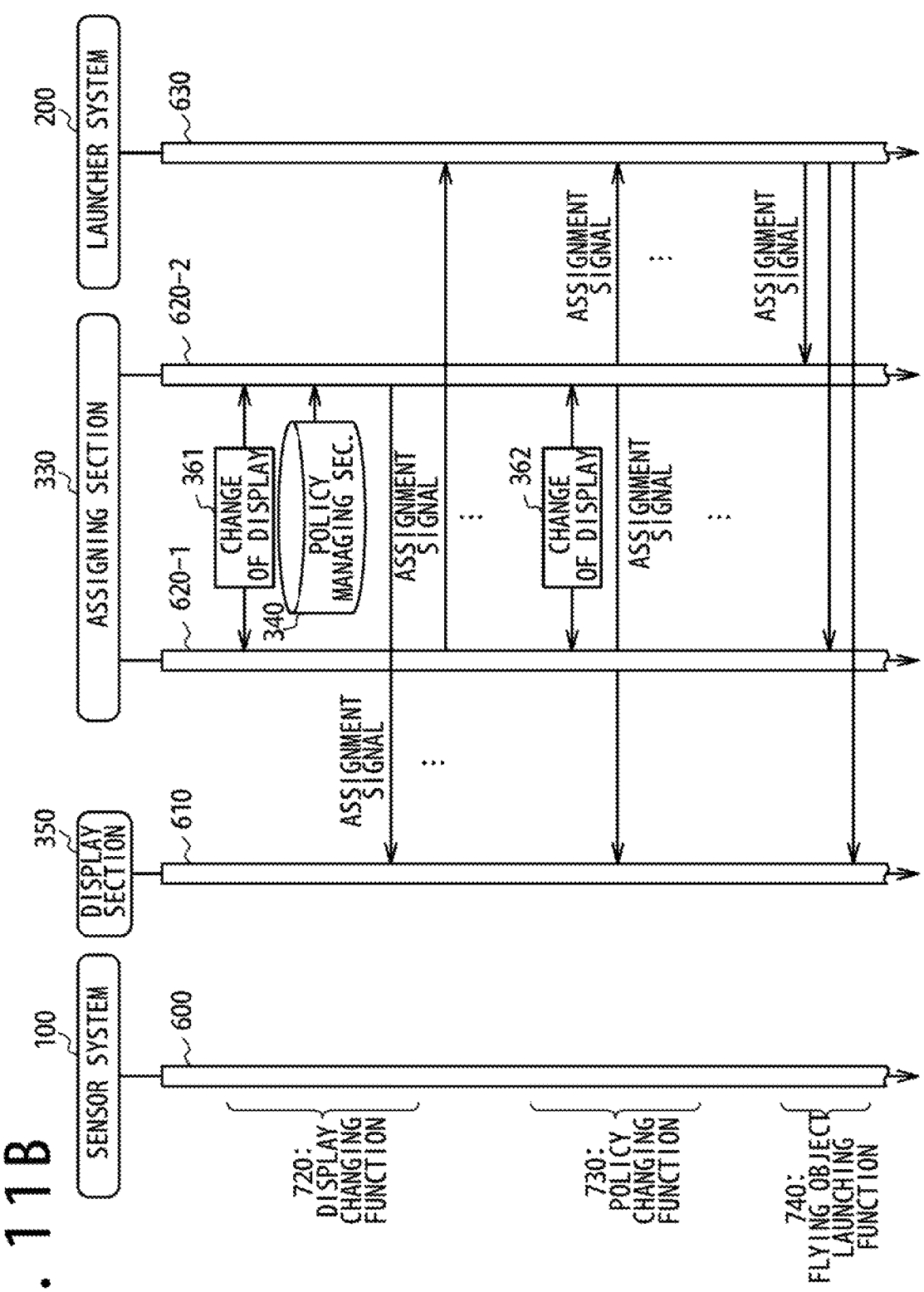

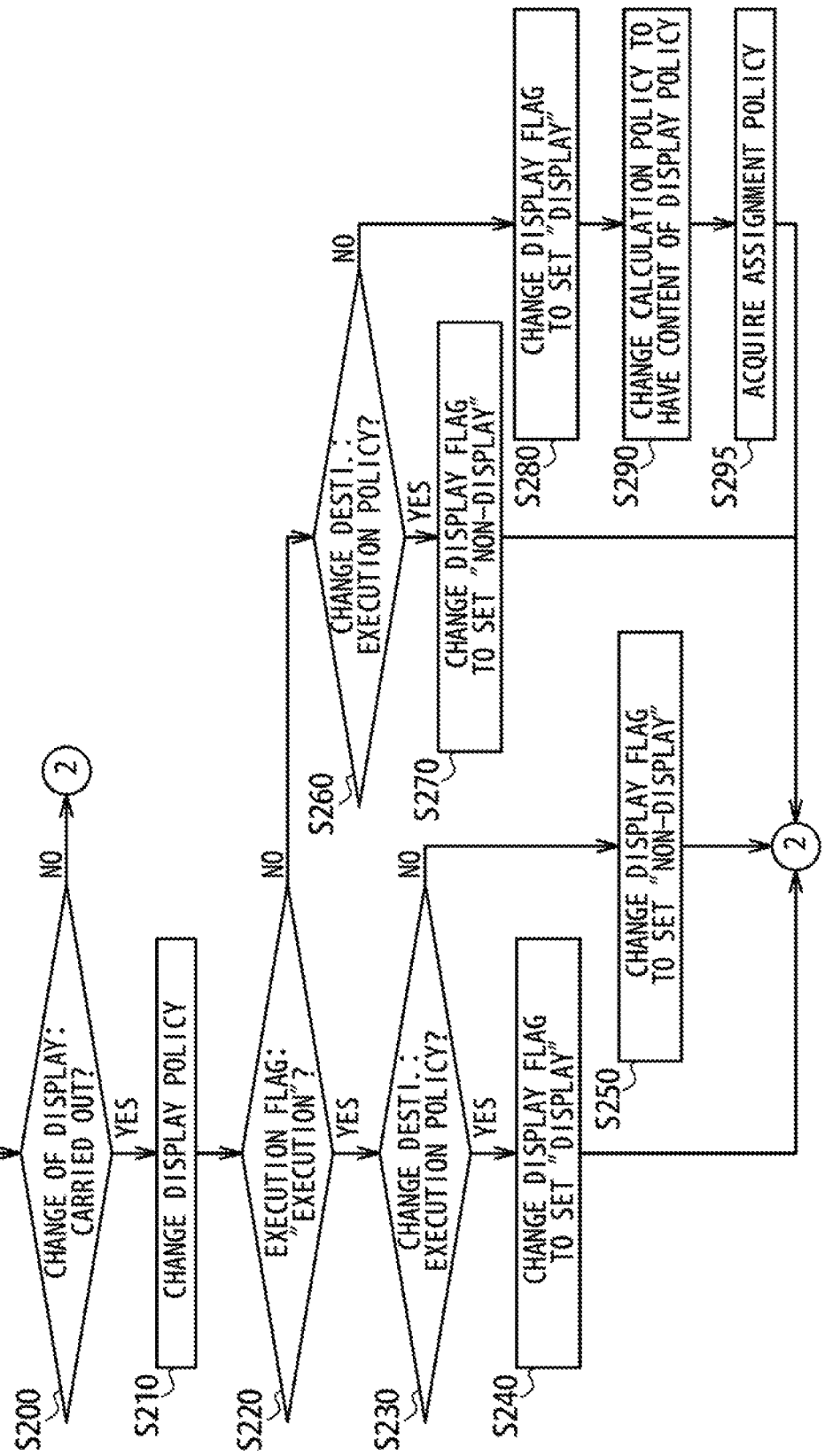

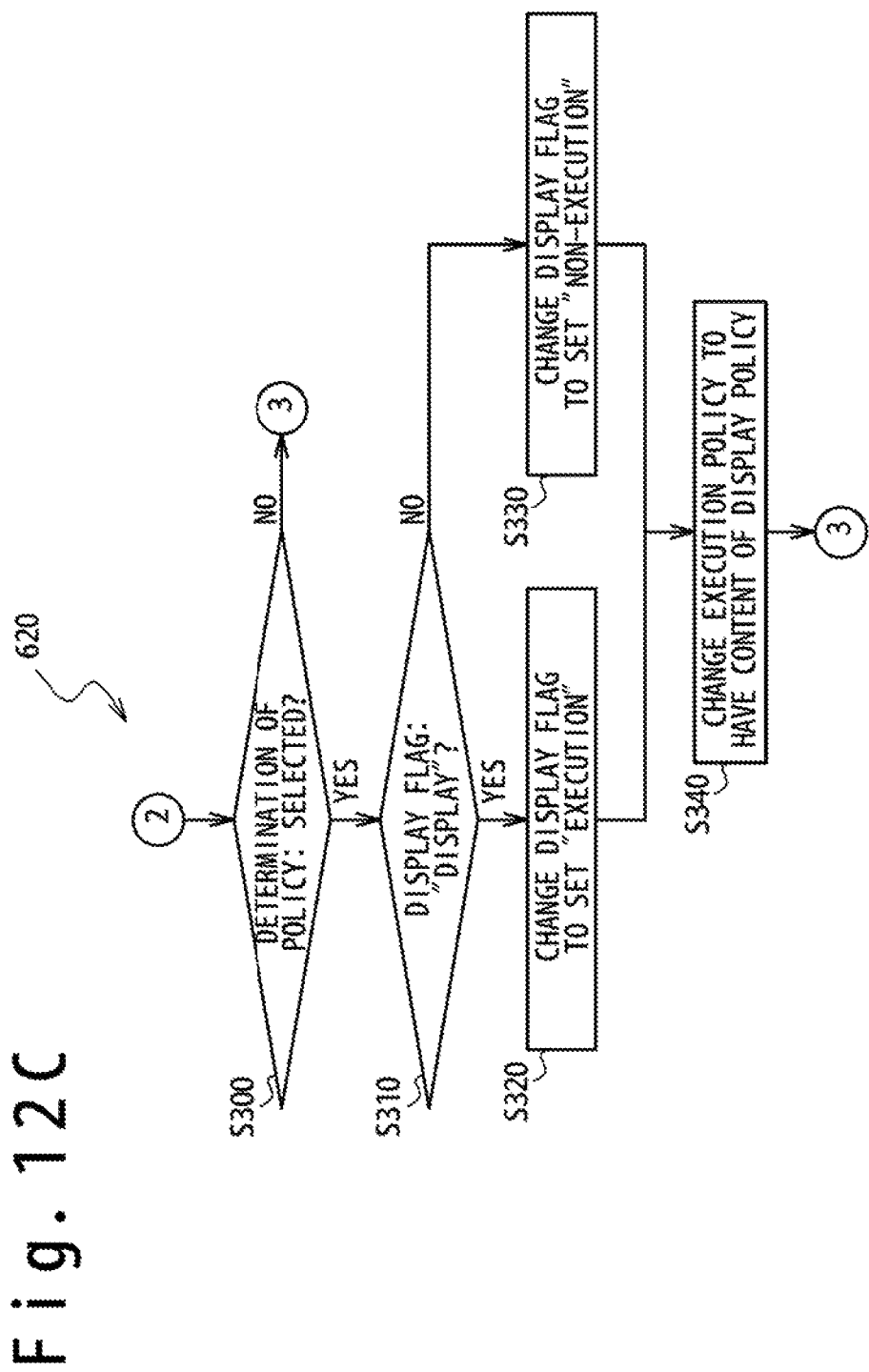

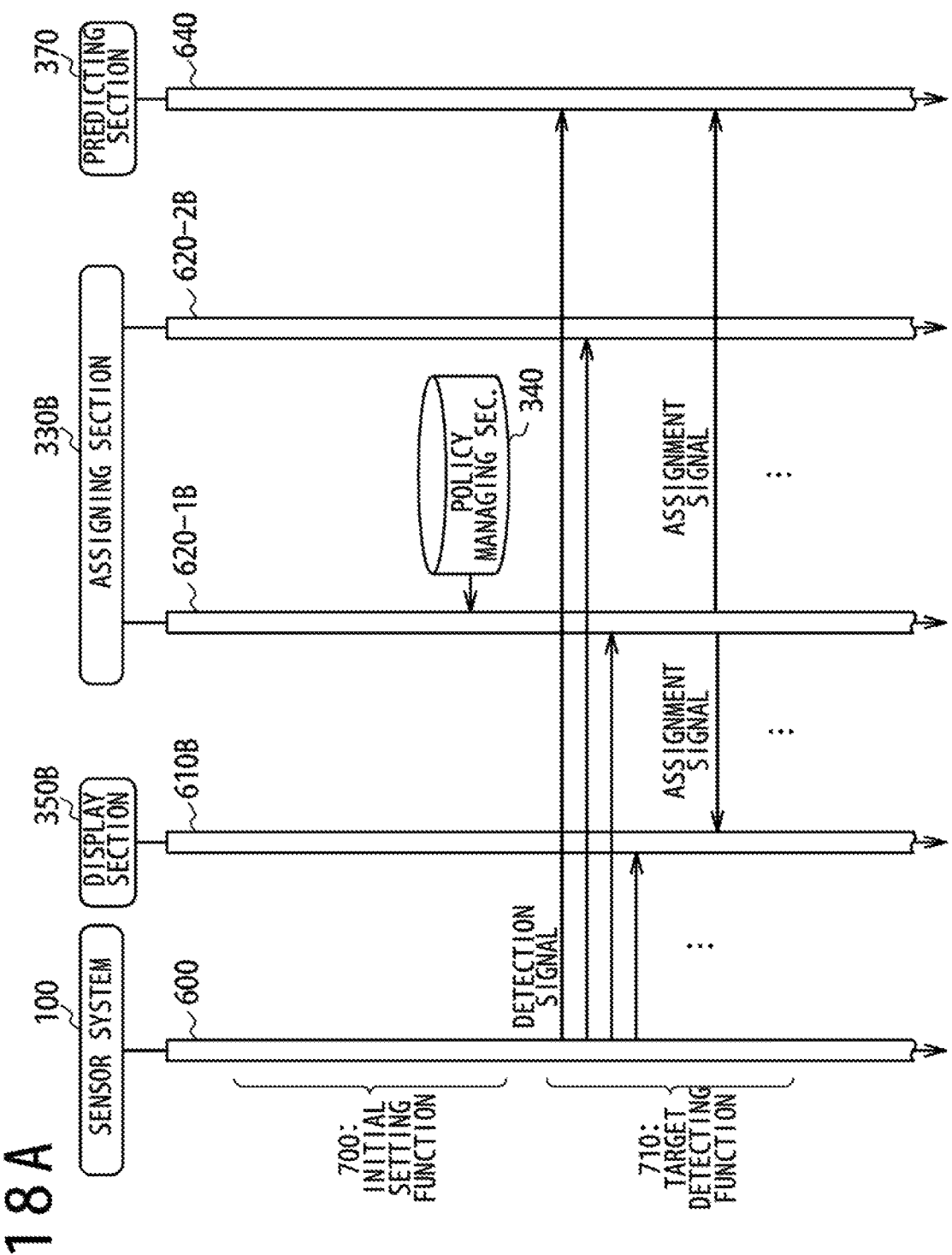

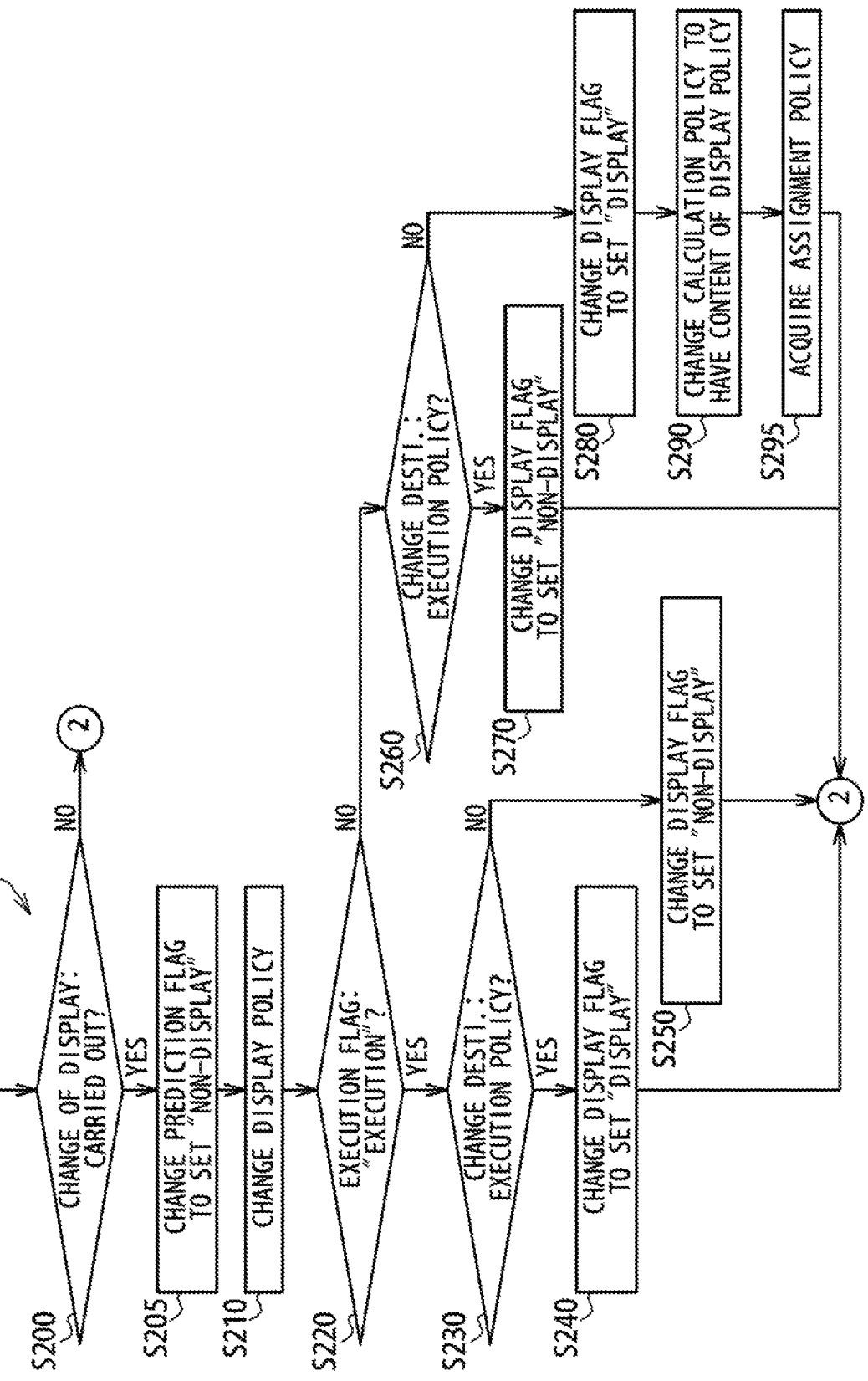

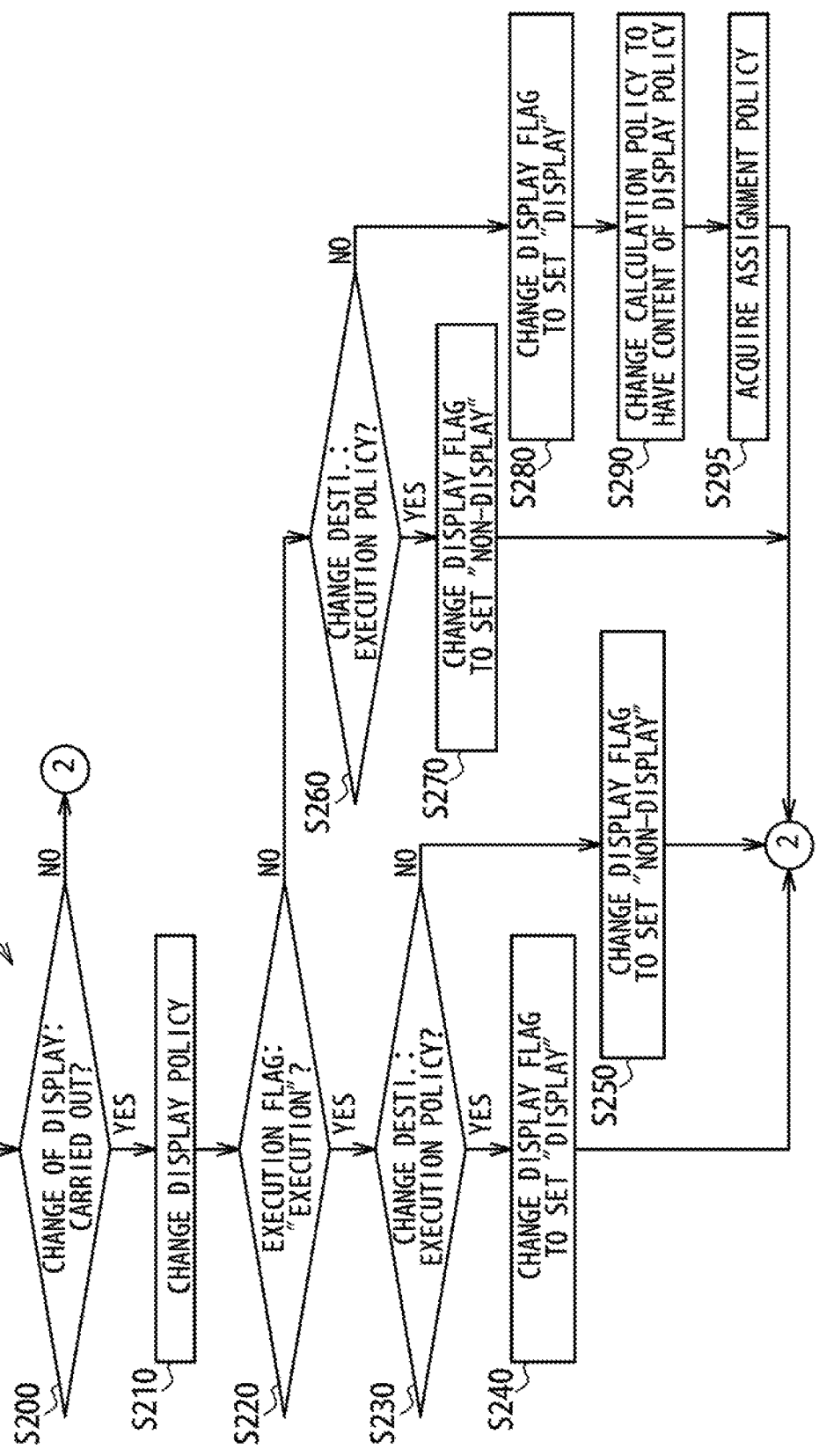

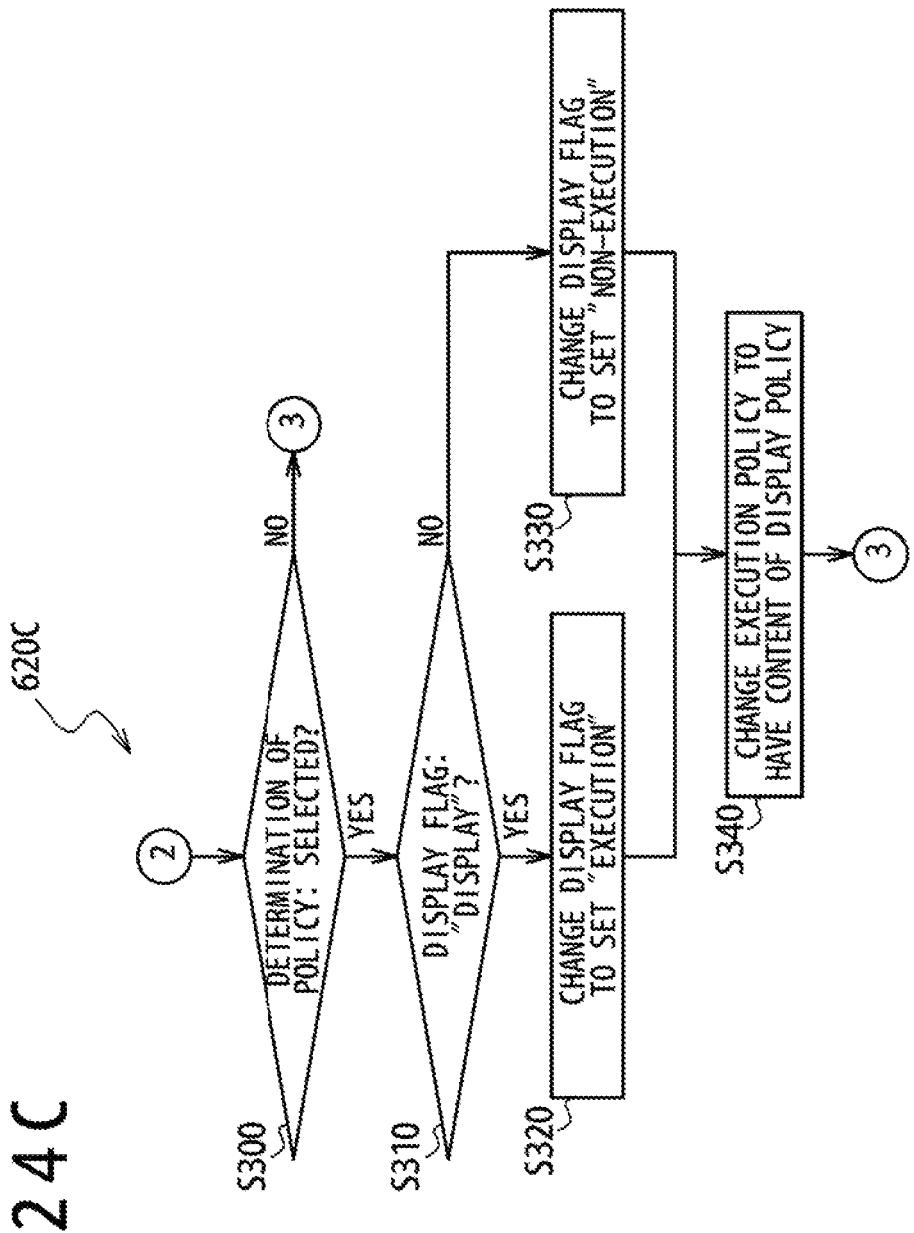

TARGET ASSIGNMENT SYSTEM, COMMAND SYSTEM, AND TARGET ASSIGNMENT METHOD

TECHNICAL FIELD

The present invention relates to a target assignment system, a command system, and a target assignment method.

BACKGROUND ART

When a moving vehicle should be intercepted by a plurality of launcher systems, the launcher system which intercepts the moving vehicle must be determined. Especially, when a plurality of moving vehicles should be intercepted, there is a problem in which each of the moving vehicles should be assigned to any of the launcher systems.

A firepower assignment apparatus is disclosed in Patent Literature 1 to assign each of moving vehicles to any one of the launcher systems. The firepower assignment apparatus estimates a residual value based on a threat degree of the moving vehicle and an interception probability. Each of the moving vehicles is assigned to any one of the launcher systems so as for the estimated residual value to meet a predetermined condition.

CITATION LIST

[Patent Literature 1] JP 3,013,726B

SUMMARY OF THE INVENTION

A flying object is manually or automatically launched for a moving vehicle. When manually launching the flying object, an operator determines launching of the flying object individually to each moving vehicle. In this case, there is a case that the launching timing of the flying object is lost and a wrong judgement is carried out. When automatically launching the flying object, the launcher system automatically launches the flying object based on a predetermined condition. However, there is a case that a change of a situation cannot be dealt with.

The present invention is made, considering the above-mentioned situation. One object of the present invention is to provide a target assignment system which can deal with the change of a situation. Other objects could be understood from the following description and explanation of the embodiments.

To achieve the above object, a target assignment system according to a first aspect of the present invention includes a sensor system, an assigning section, a display section and an input section. The sensor system detects a position of a moving vehicle and generates a detection signal. The assigning section determines a launcher system assigned with the moving vehicle in response to the detection signal, and generates a first display signal showing the moving vehicle and a first launcher system as the assigned launcher system. The display section displays the moving vehicle and the assigned launcher system in real time in response to the display signal. The input section generates an assignment change signal to instruct a change of the assigned launcher system. The assigning section generates a second display signal to change the assigned launcher system from the first launcher system to a second launcher system in response to the assignment change signal.

The above-mentioned target assignment system may further include a policy management section having a first assignment policy used to assign the moving vehicle to the first launcher system, and a second assignment policy used to assign the moving vehicle to the second launcher system.

In this case, the assigning section acquires the first assignment policy from the policy management section and generates the first display signal in response to the detection signal. The input section generates the assignment change signal when the second assignment policy is selected.

The above-mentioned input section may generate a first display change signal when a display which is based on the second assignment policy is instructed. The assigning section may generate a second display signal in response to the first display change signal to change the assigned launcher system from the first launcher system to the second launcher system.

The above-mentioned target assignment system may further include a predicting section configured to calculate a position of the moving vehicle predicted after a predetermined time passes from reception of the detection signal, and generate a third display signal containing the calculated position of the moving vehicle.

The above-mentioned predicting section may calculate a position of the flying object, which has been launched from the assigned launcher system, in response to the first display signal or the second display signal, and the calculated position of the flying object may be contained in a third assignment signal. In this case, the display section displays the calculated position of the flying object in response to the third assignment signal.

The above-mentioned input section may generate the assignment change signal in response to an instruction to assign the moving vehicle to the second launcher system.

The above-mentioned sensor system may calculate a moving direction and moving speed of the moving vehicle in response to a change of the position of the moving vehicle. In this case, the assigning section calculates a meeting position and a meeting time of the moving vehicle and the flying object launched from the assigned launcher system based on the moving direction and moving speed of the moving vehicle, and generates the first display signal or the second display signal, so as to contain the meeting position and the meeting time. The display section displays the meeting position and the meeting time in response to the first display signal or the second display signal.

The above-mentioned assigning section holds historical interception records, calculates an interception rate at the meeting position based on the historical interception records, and generates the first display signal or the second display signal, so as to contain the interception rate. In this case, the display section displays the interception rate in response to the first display signal or the second display signal.

The above-mentioned assigning section may calculate as a launching position, the position of the moving vehicle at a time when the flying object is launched, based on the moving direction and the moving speed of the moving vehicle, and generate the first display signal or the second display signal, so as to contain the launching position. In this case, the display section displays the launching position in response to the first display signal or the second display signal.

A command system according to a second aspect of the present invention is provided with the assigning section of the above-mentioned target assignment system.

A target assignment method according to a third aspect of the present invention includes determining a launcher system assigned with a moving vehicle in response to a detection signal which contains a position of the moving vehicle detected by a sensor system; generating a first display signal showing the moving vehicle and a first launcher system as the assigned launcher system; displaying the moving vehicle and the assigned launcher system in real time in response to the first display signal; and generating a second display signal to change the assigned launcher system from the first launcher system to a second one launcher system in response to an assignment change signal to instruct a change of the assigned launcher system.

A target assigning program according to a fourth aspect of the present invention which makes a computer execute the following steps of: determining a launcher system assigned with a moving vehicle in response to a detection signal which contains a position of the moving vehicle detected by a sensor system; generating a first display signal showing the moving vehicle and a first launcher system as the assigned launcher system; displaying the moving vehicle and the assigned launcher system in real time in response to the first display signal; and generating a second display signal to change the assigned launcher system from the first launcher system to a second the launcher system in response to an assignment change signal to instruct a change of the assigned launcher system.

According to the present invention, the assignment of the moving vehicle can be changed according to the change of a situation.

BRIEF DESCRIPTION OF THE DRAWINGS

FIG. 11A is a sequence diagram showing cooperation among systems in the interception system according to the first embodiment.

FIG. 11B is a sequence diagram showing cooperation among the systems in the interception system according to the first embodiment.

FIG. 12B is a flow chart showing processing of the assigning section of FIG. 6.

FIG. 12C is a flow chart showing processing of the assigning section of FIG. 6.

FIG. 18A is a sequence diagram showing cooperation among systems in the interception system according to the second embodiment.

FIG. 19B is a flow chart showing processing of the assigning section of FIG. 15.

FIG. 24B is a flow chart showing processing of the assigning section of the interception system according to the third embodiment.

FIG. 24C is a flow chart showing processing of the assigning section of the interception system according to the third embodiment.

DESCRIPTION OF EMBODIMENTS

First Embodiment

The configuration of an interception system according to a first embodiment will be described.

Figure 1:
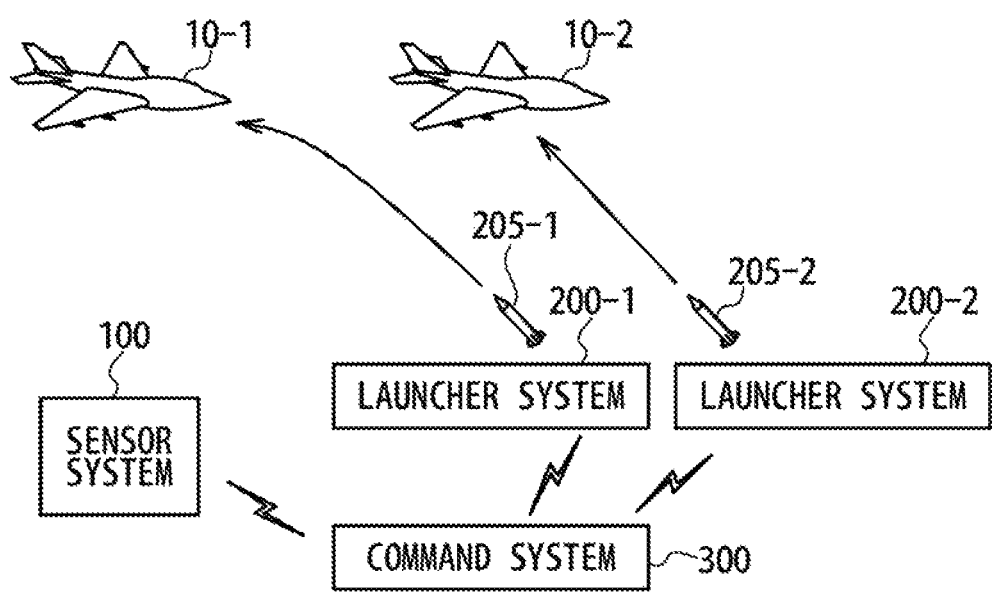
FIG. 1 is a diagram schematically showing an interception system according to a first embodiment.

As shown in FIG. 1, the interception system of moving vehicles 10 (10-1, 10-2, . . . ) includes a sensor system 100, a plurality of launcher systems 200 (200-1, 200-2, . . . ) and a command system 300. The interception system detects the moving vehicles 10 by the sensor system 100, and launches flying objects 205 (205-1, 205-2, . . . ) to shoot down the moving vehicles. First, the sensor system 100 detects the moving vehicles 10 as targets. The command system 300 determines the launcher systems 200 to intercept the detected moving vehicles 10. In other words, the moving vehicles 10 are assigned to the launcher systems 200. The launcher systems 200 launch the flying objects 205 for the assigned moving vehicles 10 to intercept them.

Figure 2:
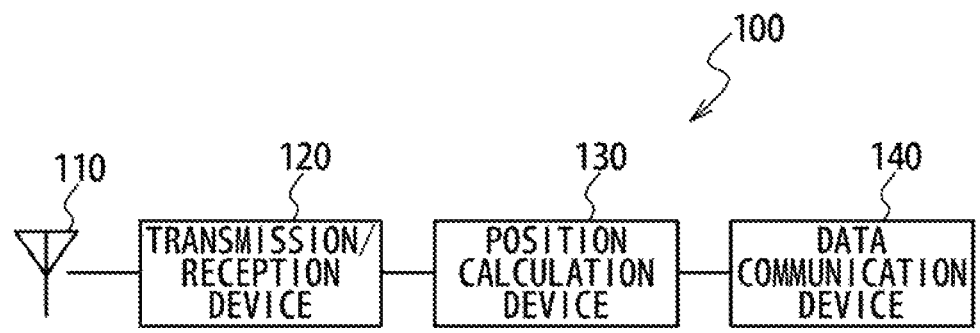
FIG. 2 is a diagram schematically showing a sensor system of FIG. 1.

The sensor system 100 detects the moving vehicles 10 and the flying objects 205. As shown in FIG. 2, the sensor system 100 has an antenna 110, a transmission/reception device 120, a position calculation device 130 and a data communication device 140.

The antenna 110 carries out the transmission and reception of a radio wave signal to detect the moving vehicles 10 and the flying objects 205. Specifically, the radio wave is transmitted according to an output from the transmission/reception device 120. Also, the reflected wave from the moving vehicle 10 is received and sent to the transmission/reception device 120.

The transmission/reception device 120 determines a frequency and direction of the radio wave to be transmitted from the antenna 110. Also, the transmission/reception device 120 calculates a relative position of each of the moving vehicles 10 to the sensor system 100 based on the received reflection wave. A signal of the calculated relative position is transmitted to the position calculation device 130.

The position calculation device 130 calculates the positions of the moving vehicles 10 and the flying objects 205 and generates a detection signal. The position calculation device 130 receives the relative position ox each of the moving vehicles 10 from the transmission/reception device 120. Also, the position of the sensor system 100 is previously registered on the position calculation device 130. Therefore, the position calculation device 130 calculates the position of each moving vehicle 10 based on the position of the sensor system 100 and the received relative position of each moving vehicle 10. For example, the position of each moving vehicle 10 to be calculated has latitude, longitude, and altitude. In other words, the position calculation device 130 calculates the position on the coordinate system unified by the interception system. Also, the sensor system 100 transmits the radio wave continuously or intermittently to continue to detect the moving vehicles 10. Therefore, the position calculation device 130 calculates a moving speed and moving direction of each moving vehicle 10 from a position change of each of the detected moving vehicles 10. Regarding the flying object 205, similarly, the position calculation device 130 calculates a position, moving speed and moving direction of each of the flying objects 205. The position calculation device 130 generates the detection signal containing the calculated data.

The data communication device 140 transmits the detection signal of the calculated moving vehicles 10 and flying objects 205 to another launcher system. Specifically, the data communication device 140 transmits to the command system 300. The position, moving speed, moving direction and so on of each of the moving vehicles 10 are contained in the detection signal. Also, a moving vehicle identifier is contained in the detection signal to identify each of the moving vehicles 10. Thus, the position, moving speed, and moving direction of the moving vehicle 10 can be shared by the respective launcher systems of the interception system. Using the radio wave, one system of them carries cut signal transmission and reception to and from another system. Also, data of friends detected by the sensor system 100 is processed in the same way.

Figure 3:
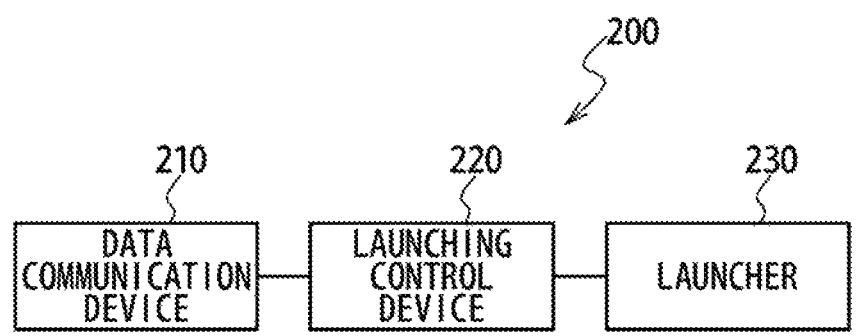
FIG. 3 is a diagram schematically showing a launcher system of FIG. 1.

The launcher system 200 launches the flying object 205 for the moving vehicle 10 to be intercepted. The launcher system 200 has a data communication device 210, a launching control device 223 and a launcher 230, as shown in FIG. 3.

The data communication device 210 carries cut the transmission and reception of data to and from another system. Specifically the data communication device 21 receives a target signal containing data showing a position of the moving vehicle 10 to be intercepted and an assignment signal showing the assigned moving vehicle 10 from the command system 300. The data communication device 210 carries oat the transmission and reception of data with another system by radio wave.

The launching control device 220 controls the launcher system 200 to launch the flying object 205. The launching control device 220 transmits a launching signal for the flying object 205 to the launcher 230 when the moving vehicle 10 assigned from the command system 300 has reached a predetermined position. Also, the launching control device 220 has data of the launcher system 200 such as the number of owned flying objects 205 and the number of currently loaded flying objects 205. The data of the number of owned flying objects 205 and the number of loaded flying objects 205 are transmitted to the command system 300 through the data communication devise 210.

The launcher 230 launches the flying object 205 in response to the launching signal from the launching control device 220.

Figure 4:
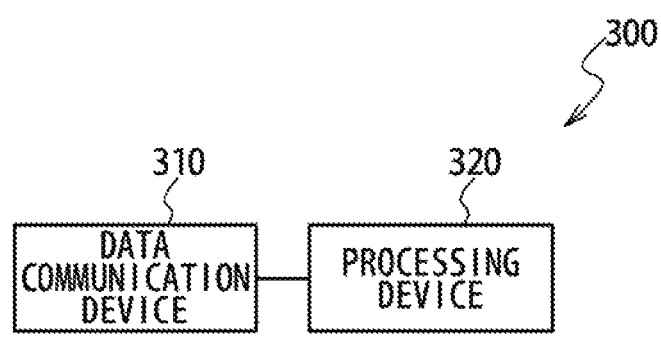
FIG. 4 is a diagram schematically showing a command system of FIG. 1.

The command system 300 assigns the moving vehicle 10 detected, by the sensor system 100 to the launcher system 200. The command system 300 has a data communication device 310 and a processing device 320, as shown in FIG. 4.

The data communication device 310 carries out the transmission and reception of data to and from another system. Specifically, the data communication device 310 receives the detection signal of the moving vehicles 10 from the sensor system 100. Also, the data communication device 310 generates and transmits the assignment signal showing the moving vehicles 10 and the launcher systems 200 assigned to the moving vehicles 10, to the launcher systems 200. Moreover, the data communication device 310 generates and transmits the target signal, which contains the position, data of each, of the moving vehicles 10, to the launcher system 200. The data communication device 310 carries out the transmission and reception of data to and from another system by radio wave.

The processing device 320 assigns each of the moving vehicles 10 detected by the sensor system 100 to one of the launcher systems 200. Also, the processing device 320 displays data showing the position and moving direction of the moving vehicle 10, and data showing the number of flying objects 205 owned by the launcher system 200. Also, the processing device 320 displays a combination of the moving vehicle 10 and the launcher system 250 assigned to the moving vehicle 10.

Figure 5:
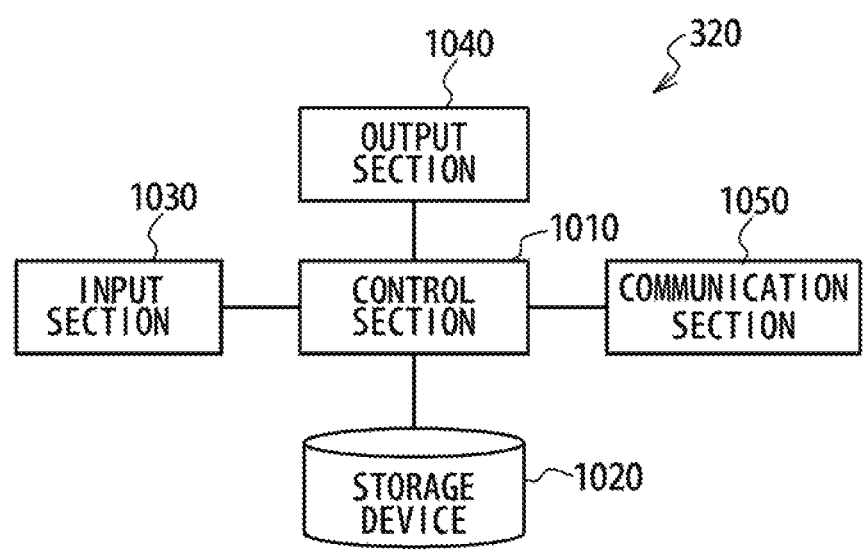
FIG. 5 is a diagram showing a hardware configuration of a central processing unit in FIG. 4.

The hardware configuration of the processing device 320 includes a control section 1010, a storage device 1020, an input section 1030, an output, section 1040 and a communication section 1050 as shown in FIG. 5. In other words, the processing device 320 has the configuration similar to that of the computer.

The control section 1010 controls an output to the output section 1040 and a communication with an external unit through the communication section 1050 and so on. Also, the control section 1010 reads a stored program from the storage device 1020 and operates based on instructions of the program. The control section 1010 contains a central processing unit (CPU) and so on.

The storage device 1020 stores various data such as the position, moving direction and moving speed of the moving vehicle 10, and the program. The storage device 1020 transmits data to the control section 1010 in response to a command from the control section 1010. For example, the storage device 1020 may be a hard disk drive, a memory and so on.

The input section 1030 inputs data from an external unit. The inputted data is transmitted to the control section 1010. The input section 1030 has input devices such as a keyboard, a mouse, and a touch panel.

The output section 1040 outputs a result calculated by the control section 1010 and so on to an external unit. For example, the output section 1040 may be a display, a speaker, a touch panel and so on.

The communication section 1050 carries out the transmission and reception of data to and from an external unit outside the processing device 320. Specifically, when receiving the detection signal of the moving vehicles 10 from the sensor system 100, the communication section 1050 is used to transmit the assignment signal showing each of the moving vehicles 10 and the launcher system 200 assigned to the moving vehicle 10. The communication section 1050 may be a network interface card connected with a LAN (Local Area Network) and so on, and a terminal connected with an external unit such as a USB terminal, and a serial terminal.

Also, each of the position calculation device 130 and the launching control device 220 has the configuration shown in FIG. 5, like the processing device 320.

The functional block configuration of the interception system will be described.

Figure 6:
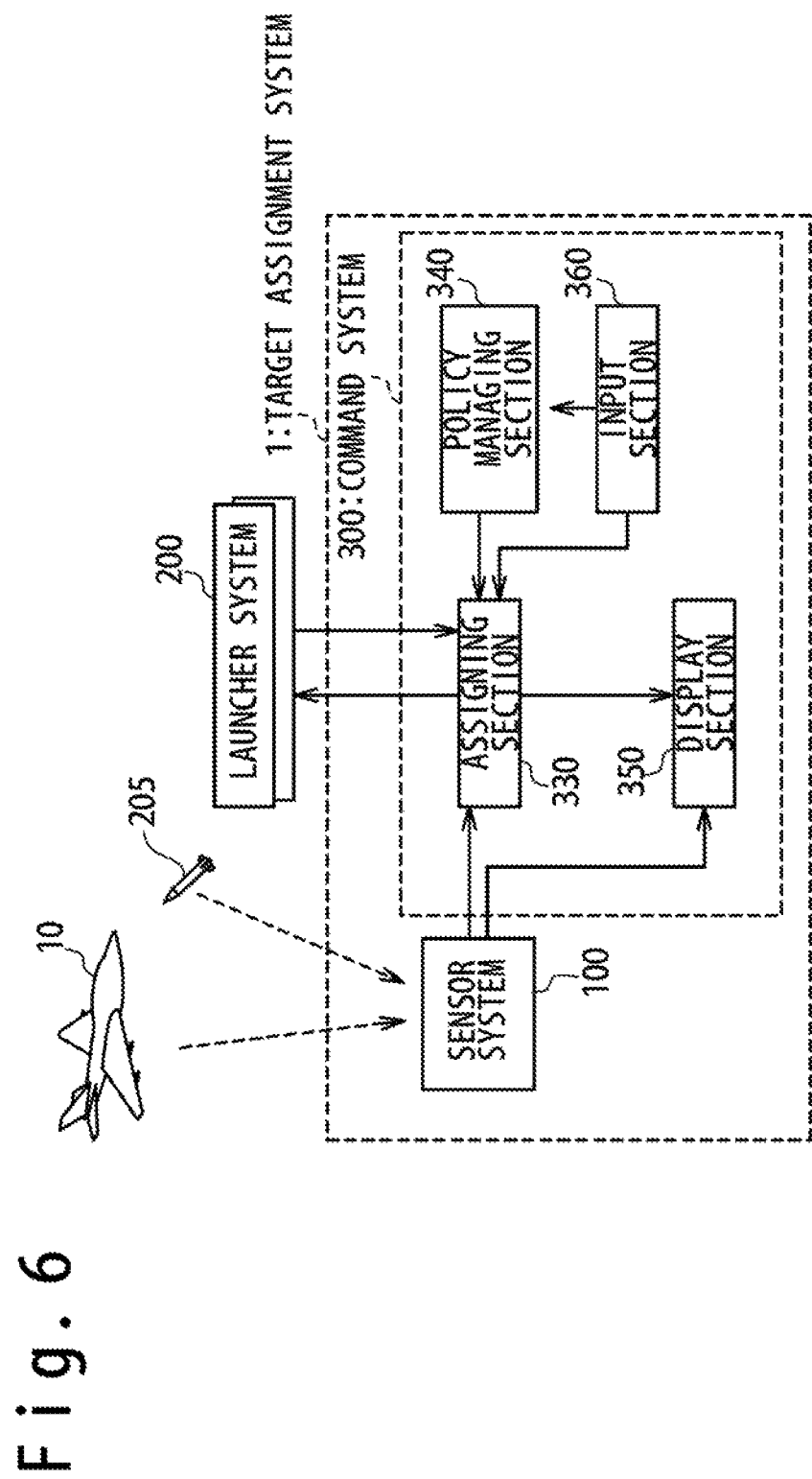
FIG. 6 is a functional block diagram showing the interception system according to the first embodiment.

The interception system has a plurality of launcher systems 200 and a target assignment system 1, as shown in FIG. 6. The sensor system 100 and the command system 300 are contained in the target assignment system 1.

The sensor system 100 detects the moving vehicles 10 as targets and the flying objects 205 by using a radar device, and calculates data of each of the moving vehicle 10 and data of the flying object 205 assigned to the moving vehicle such as the position, moving speed, and moving direction of the flying object 205. The calculated data are transmitted to the command system 300 as the detection signal.

The command system 300 assigns the moving vehicles 10 to the launcher systems 200 in response to the detection signal received from the sensor system 100. Also, the command system 300 displays a combination of the moving vehicle 10 and the launcher system 200 assigned no the moving vehicle 10 in real time. Also, the command system 300 transmits the data of the moving vehicle 10 contained in the detection signal to the launcher system 200 as a target signal. The command system 300 has an assigning section 330, a policy managing section 340, a display section 350 and an input section 360.

The assigning section 330 assigns the moving vehicle 10 to the launcher systems 200 in response to on the detection signal received from the sensor system 100. The assigning section 330 transmits an assignment signal which contains the assignment result, to the launcher systems 200 and the display section 350. The assigning section 330 acquires a position of each launcher system 200 for the assignment of the moving vehicle 10 to the launcher system 200. Also, the assigning section 330 acquires an assignment policy showing a condition to assign the moving vehicle 10 to the launcher system 200, from the policy managing section 340.

The assigning section 330 assigns the moving vehicle 10 to the launcher system 200 based on the positions of the launcher systems 200, data of the moving vehicles 10 and the assignment policy.

The policy managing section 340 stores assignment policies showing the conditions to assign the moving vehicle 10 to the launcher system 200. One of the assignment policies is set based on data transmitted from the input section 360. For example, the assignment policy shows a condition that the moving vehicle 10 should be intercepted in a distant place. Also, the assignment policy may be a condition that the launcher systems 200 should own the flying objects of as even number as possible after launching the flying object. Moreover, the assignment policy may foe a condition that the moving vehicle 10 should be assigned to the launcher system having the highest interception rate.

Figure 7:
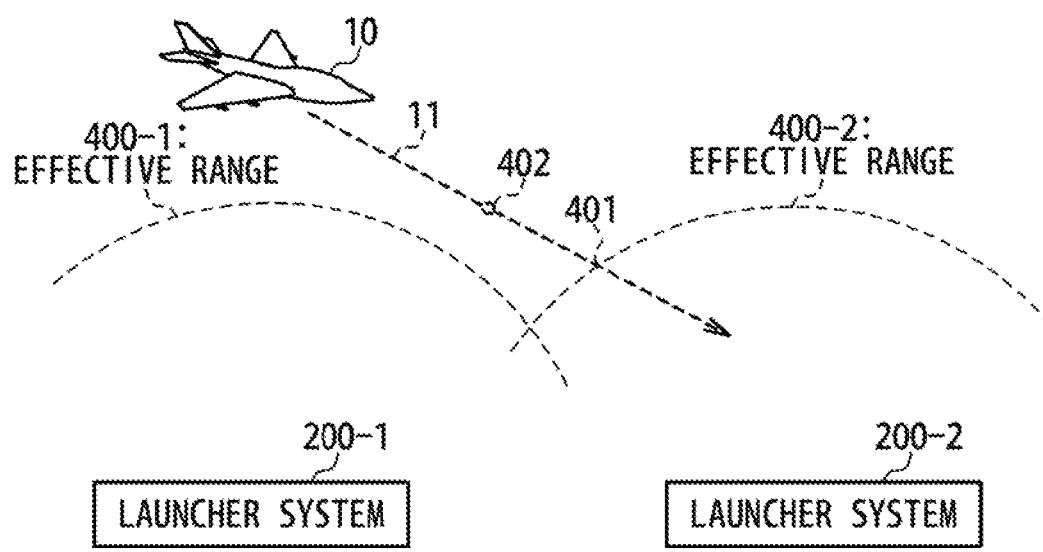
FIG. 7 is a diagram showing an assignment policy.

In case of the assignment policy of the condition that the moving vehicle 10 should be intercepted in a distant place, the moving vehicle 10 is assigned to the launcher system 200-2 having an effective range 400-2 that the moving vehicle 10 reaches first, as shown in FIG. 7. The assigning section 330 estimates a flight route 11 of the moving vehicle 10 based on the moving air-action and moving speed of the moving vehicle 10. For example, assuring that the moving vehicle 10 flies without changing the moving direction of and moving speed, the assigning section 330 estimates the flight route 11. When the moving vehicle 10 goes ahead on the estimated flight route 11, the moving vehicle 10 is assigned to the launcher system 200-2 having the effective range 400-2 which the moving vehicle 10 reaches first. In other words, in FIG. 7, the moving vehicle 10 does not enter an effective range 400-1 of the launcher system 200-1. On the other hand, the moving vehicle 10 enters the effective range 400-2 of the launcher system 200-2. Therefore, although the launcher system 200-1 is neater, the moving vehicle 10 than the launcher system 200-2, the moving vehicle 10 is assigned to the launcher systems 200-2. A point of intersection of the flight route 11 of the moving vehicle 10 and the effective range 400-2 of the launcher system 200-2 is called a range arrival point 401.

Figure 8:
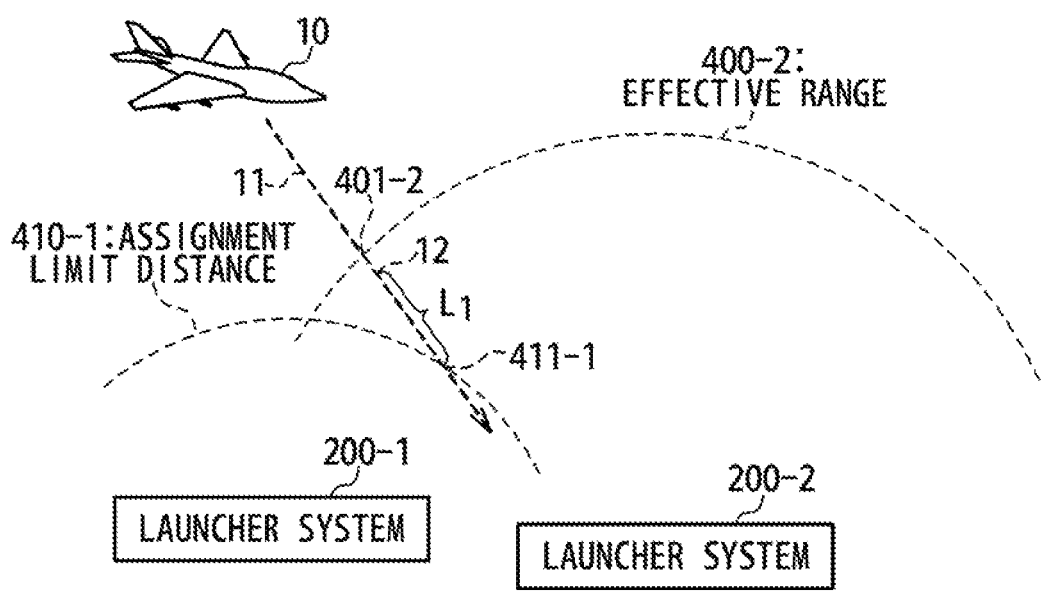
FIG. 8 is a diagram showing another assignment policy.

In case of the assignment policy having a condition that the number of owned flying objects 205 should be leveled, the moving vehicle 10 is assigned to the launcher systems 200 having the most flying objects 205 to which the moving vehicle 10 can be assigned. As shown in FIG. 8, the assigning section 330 estimates the flight route 11 of the moving vehicle 10. The assigning section 330 calculates a point 411-1, which the moving vehicle 10 reaches first, of the points of intersection of assignment limit distances 410 of the launcher systems 200 and the estimated flight route 11. The calculated, point is called an interception limit point 411-1. Here, the assignment limit distance 410 is the minimum distance to which the launcher systems 200 can intercept. In other words, the arrival of the moving vehicle 10 at the interception limit point 411-1 means arrival at the distance where the launcher system 200-1 cannot intercept. Therefore, the moving vehicle 10 should be intercepted before reaching the interception limit point 411-1. Therefore, the assigning section 330 calculates an assignment limit point 12 in front of the interception limit point 411-1 by a distance L1 on the flight route 11. The assigning section 330 searches the launcher system 200 having the effective range 400 where the moving vehicle 10 enters previously to reaching the assignment limit point 12. The launcher systems 200 obtained as the searching result are elected as assignment candidacies. The moving vehicle 10 is assigned to the launcher system 200 as one of the assignment candidacies which has the most flying objects 205. In FIG. 8, the moving vehicle 10 enters the effective range 400-2 of the launcher system 200-2 at a range arrival point 401-2. Also, since the moving vehicle 10 reaches the range arrival point 401-2 before the assignment limit point 12, the assigning section 330 adds the launcher system 200-2 to the assignment candidacies. Also, the moving vehicle 10 enters the effective range 400-1 of the launcher system 200-1 before the assignment limit point 12. Therefore, the launcher system 200-1 is added to the assignment candidacies. Here, the assigning section 330 compares the number of flying objects 205 owned by the launcher systems 200-1 and the number of flying objects 205 owned by the launcher system 200-2 and assigns the moving vehicle 10 to the launcher system which owns more flying objects 205.

In case of the assignment policy of the condition that the moving vehicle 10 should re assigned to the launcher system 200 with the highest interception rate, the moving vehicle 10 is assigned to one having the highest interception rate of the launcher systems 200 to which the moving vehicle 10 can be assigned. In other words, this assignment policy is effective when the number of flying objects 205 used for the interception of the moving vehicle 10 should be restrained, since the moving vehicle 10 is assigned to the launcher systems 200 having the high interception rate. Specifically, the assigning section 330 calculates the assignment limit point 12 and calculates assignment candidacies of the launcher systems 200 to which the moving vehicle 10 can be assigned, like the case of the assignment policy of the condition that the number of flying objects 205 should be leveled. The launcher system 200 is calculated that has a point, of the highest, interception rate on the flight route 11 after enters the effective range 400 and before the moving vehicle 10 reaches the assignment limit point 12. The calculated launcher system 200 is assigned with the moving vehicle 10 to shoot down in the calculated point.

The input section 360 transmits data inputted in response to an operation of an operator to the policy managing section 340 and the assigning section 330. Specifically, the condition of the assignment policy is inputted from the input section 360. The inputted condition of the assignment policy is transmitted to the policy managing section 340. Also, the assignment policy to be used is selected from the input section 360. Data showing the selected assignment policy is transmitted to the assigning section 330.

Figure 9:
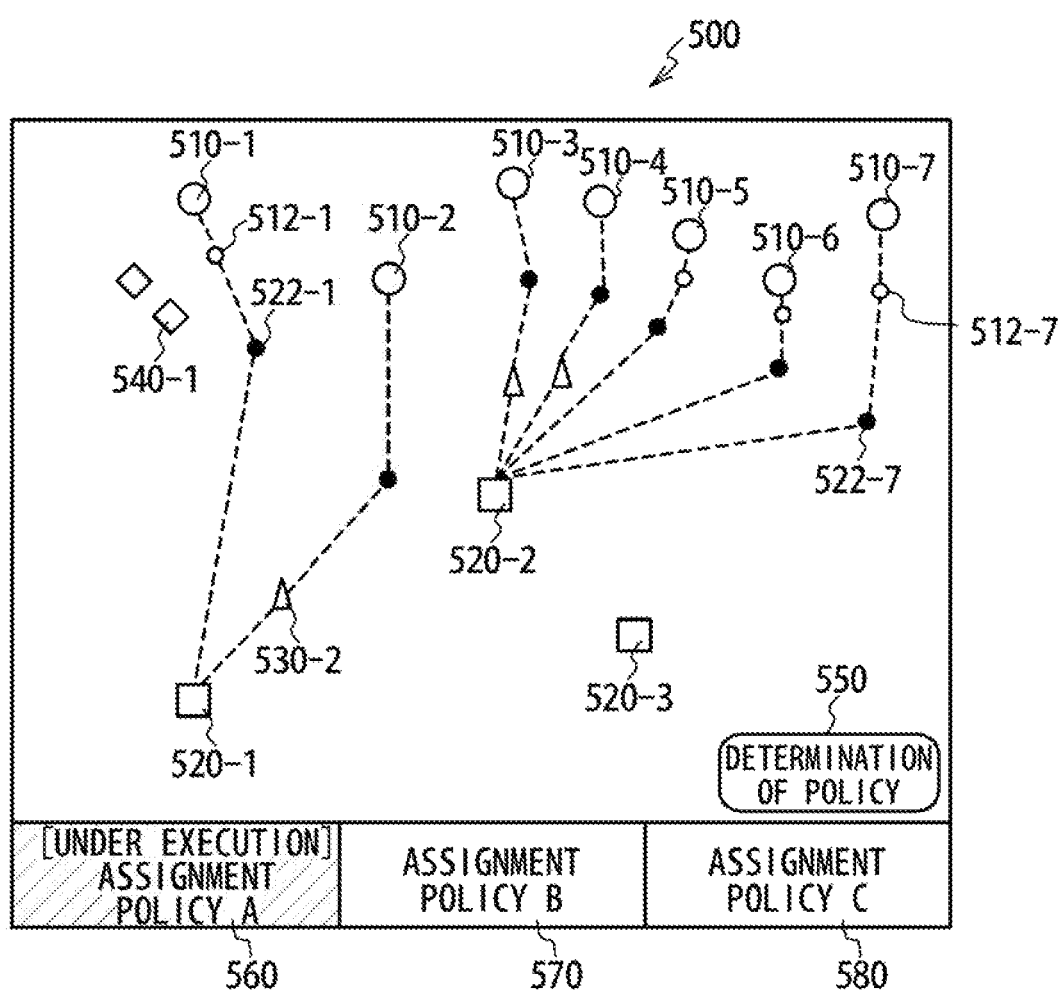
FIG. 9 is an example of display screen displayed on a display section of FIG. 6.

The display section 350 displays data of the moving vehicle 10 such as the position and the moving direction and data of the launcher systems 200 such as the numbers of owned living objects 205. Also, the display section 350 displays a combination of the moving vehicle 10 and the launcher system 200 assigned with the moving vehicle 10. Specifically, as shown in FIG. 9, positions 510 (510-1, 510-2, . . . ) of the moving vehicles 10 (10-1, 10-2, . . . ) and positions 520 (520-1, 520-2, . . . ) of the launcher systems 200 (200-1, 200-2, . . . ) are displayed on a map in a display screen 500 of the display section 350. Meeting points 522 (522-1, 522-2, . . . ), launching points 512 (512-1, 512-2, . . . ), the flying object positions 530 (530-1, 530-2, . . . ) and friend force positions 540 (540-1, 540-2, . . . ) are displayed in the display screen 500. The meeting point 522 shows a point where the flying object 205 launched from the launcher system 200 is expected to meet the moving vehicle 10. The launching point 512 shows a position of the moving vehicle 10 expected at a launching time of the flying object 205 by the launcher system 200. The flying object position 530 shows the position of the flying object 205 launched from the launcher system 200. The friend force position 540 shows the current position of the friend force.

The display section 350 acquires display data from the sensor system 100 and the assigning section 330 to display on the display screen 500. Specifically, the display section 350 receives the detection signal of the moving vehicles 10 from the sensor system 100. The display section 350 extracts the moving vehicle positions 510 showing the positions of the moving vehicles from the received detection signal. Also, the display section 350 receives the launcher system positions 520 and the assignment signal from the assigning section 330. The assignment signal contains an identifier of each of the moving vehicles, an identifier of the launcher system 200 assigned to each moving vehicle 10, the meeting points 522 and the launching points 512. Therefore, the display section 350 displays a line segment connecting the launcher system position 520-1 and the meeting point 522-1 with respect to the moving vehicle 10-1, for example. Also, the display section 350 displays a line segment connecting the moving vehicle position 510-1 and the meeting point 522-1. Also, the display section 350 displays the launching point 512-1. In other words, the moving vehicle position 510 and the launcher system position 520 assigned to the moving vehicle 510 are connected by line segments, and a combination relation of both is displayed.

The launcher system 200 launches the flying object 205 for the moving vehicle 10 to be intercepted in response to the assignment signal received from the assigning section 330. Also, the launcher systems 200 transmits its position and the number of owned flying objects 205 to the assigning section 330. The launcher system 200 receives the assignment signal containing the moving vehicle identifier from the assigning section 330. Also, the data of the moving vehicle 10 is contained in the target signal. Also, launcher system 200 searches data of the assigned moving vehicle 10 such as the position, the moving speed, and the moving direction from the data of the moving vehicles 10 contained in the target signal based on the moving vehicle identifier contained in the assignment signal. The launcher system 200 determines the timing for the flying object 205 to be launched based on the data of the moving vehicle 10, the meeting point 522 received from the assigning section 330, and the performance data of the flying objects 205 owned by the launcher system 200. Specifically, the launcher system 200 calculates a flight time from the launching of the flying object 205 by the launcher system 200 to the arrival at the meeting point 522. Next, the launcher system 200 calculates the flight route 11 of the moving vehicle 10 from the data of the moving vehicle 10 such as the position, the moving direction and the moving speed. The launcher system 200 calculates the launching point 512 of the moving vehicle 510 by the flight time before the moving vehicle 10 reaches the meeting point 522. When the moving vehicle 10 reaches the launching point 512, the launcher system 200 launches the flying object 205.

The interception system according to the first embodiment can change the launcher system 200 assigned with the moving vehicle 10 after the moving vehicle 10 is assigned to the launcher system 220 before the launcher system 200 launches the flying object 205 for the moving vehicle 10. This change operation will be described.

A display screen 500 is displayed on the display sect ion 350 as shown in FIG. 9. The display screen 500 shows the current positions of the moving vehicle 10 and the flying object 205 in real time based on the data received from the sensor system 100. Also, the display section 350 displays the display screen 500 based on an assignment policy A to show the combination relation of the moving vehicle 10 and the launcher system 200 assigned with the moving vehicle 10. In the display screen 500, the moving vehicle 10-1 in the moving vehicle position 510-1 and the moving vehicle 10-2 in the moving vehicle position 510-2 are assigned to the launcher system 200-1 in the launcher system position 520-1. Also, the moving vehicles 10-3 to 10-7 in the moving vehicle positions 510-3 to 510-7 are assigned to the launcher system 200-2 in the launcher system position 520-2. No moving vehicle 10 is assigned to the launcher system 200-3 in the launcher system position 520-3, The launcher system 200-1 of the launcher system position 520-1 has already launched the flying object 205-2 for the moving vehicle 10-2. The current position of the flying object 205-2 is in the flying object position 530-2. The launcher system 200-2 in the launcher system position 520-2 has already launched the flying objects 205 to the moving vehicle 10-3 and the moving vehicle 10-4. At this time, the assigning section 330 has assigned the moving vehicles 10 to the launcher system 200 based on she assignment policy A. A character string of "under execution" is displayed on an assignment policy A button 560 on the display screen 500. This means that the assigning section 330 is using the assignment policy A for the calculation. Also, the assignment policy A button 560 has been selected. This means that the calculation result when the assignment policy A is used is displayed.

Figure 10:
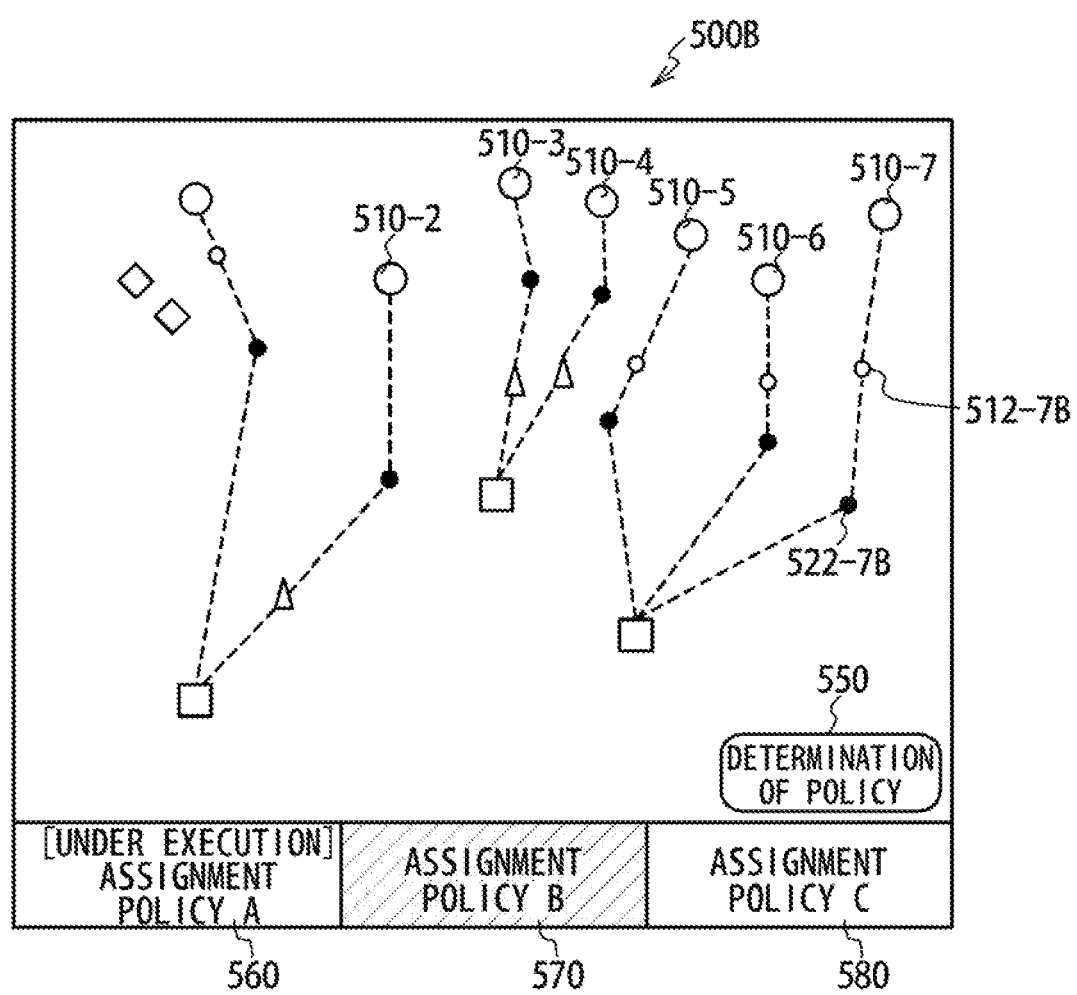
FIG. 10 is another example of display screen displayed on the display section of FIG. 6.

When the operator selects an assignment policy B button 570 displayed on the display screen 500, the calculation result in case of using the assignment policy B is displayed, as shown in FIG. 10. In this case, the assignment policy used for the calculation when the assigning section 330 assigns the moving vehicle 10 to the launcher system 200 is not changed. Therefore, "under execution" is displayed on the assignment policy A button 560. However, since the assignment policy B button has been selected, the calculation result using the assignment policy B is displayed. In other words, the operator can check the calculation result when using the assignment policy B while executing the assignment processing based on the assignment policy A. In this case, the moving vehicles 10-2, 10-3, and 10-4 in the moving vehicle positions 510-2, 510-3 and 510-4 for which the flying objects 205 have already launched are displayed without changing the assignment. Regarding the moving vehicles 10-1, 10-5, 10-6, and 10-7 in the moving vehicle positions 510-1, 510-5, 510-6 and 510-7 for which the flying objects 205 are not yet launched, the display section 350 displays combination relation of the above moving vehicles 10-1, 10-5, 10-6, and 10-7 and the launcher system 200 based on the assignment policy B. As a result, regarding the moving vehicle position 510-7, the display positions of the launching point 512-7 and the meeting point 522-7 are changed to the launching point 512-7B and the meeting point 522-7B. Note that since the moving vehicle position 510-7 is the current position of the moving vehicle 10-7, the display position cities not change, even if the assignment policy is changed.

When the operator selects a policy determining button 550 on the display screen 500B, the assigning section 330 changes the assignment policy to the calculate the assignment of the moving vehicles 10. In other words, the assignment of the moving vehicles 10 to the flying objects 205 which are not yet launched are changed after launching the flying objects 205 to the moving vehicles 10. As a result, the string of "under execution" is displayed on an assignment policy B button 570 and the string of "under execution" on the assignment policy A button 560 is deleted. Note than the assignment policy used to control the launcher systems 200 by assigning the moving vehicles 10 is called "the assignment policy under execution".

In this way, the target assignment system 1 displays the current positions of the moving vehicle 10 and the flying object 205, and the combination relation of the moving vehicle 10 and the launcher system 200 assigned to the moving vehicle 10 in real time. Also, according to the situation, the target assignment system 1 can change the assignment of the moving vehicle 10 to the launcher system 200.

Next, the operation of the interception system which contains the target assignment system 1 will be described. First, the cooperation between the systems will be described.

The interception system achieves its function by carrying out the transmission and reception of data among the sensor system 100, the display section 350, the assigning section 330 and the launcher system 200, as shown in the FIG. 11A and FIG. 11B. The processing function is classified into an initial setting function 700, a target detecting function 710, a display changing function 720, a policy changing function 730 and a flying object launching function 740. Here, the assigning section 330 executes assignment processing 620-1 of assigning the moving vehicle 10 to the launcher system 200 and assignment processing 620-2 of displaying on the display section 350. Here, when the assignment policy under execution of the assignment processing of assigning the moving vehicle 10 to the launcher system 200 and the assignment policy under display are the same as shown in FIG. 9, either of the assignment processing 620-1 and the assignment processing 620-2 is carried out by using the same assignment policy. As shown in FIG. 10, when the assignment policy under the execution and the assignment policy under display are different, the processing is carried out by using the assignment policy under execution in one of the assignment processing 620-1 and the assignment processing 620-2, and one processing is carried out by using the assignment policy under display in the other.

First, in the interception system, the initial setting function 700 is executed. Each of the launcher systems 200 transmits a position signal showing the position of the launcher system 200 to the assigning section 330 and the display section 350. Next, each launcher system 200 transmits a performance signal showing the performances and the number of flying objects 205 owned by the launcher system 200 to the assigning section 330. Also, the assigning section 330 acquires the assignment policy from the policy managing section 340 to assign the moving vehicle 10 to the launcher system 200 by using the acquired assignment policy. Thus, the assigning section 330 can acquire all of the data necessary to assign the moving vehicles 10 to the launcher systems 200. Also, the display section 350 can acquire the position data of the launcher systems 200 which are necessary to display the launcher systems 200.

When the sensor system 100 detects the moving vehicles 10, the target detecting function 710 is executed. In the target detecting function 710, the detected moving vehicles 10 are assigned to the launcher systems 200 and the assignment result is displayed on the display section 350. The sensor system 100 transmits the detection signal of the detected moving vehicles 10 to the display section 350 and the assigning section 330. The assigning section 330 transmits the data of the moving vehicles 10 to the launcher systems 200 by the target signal in response to the received detection signal. Also, the assigning section 330 assigns the detected moving vehicles 10 to the launcher systems 200 based on the assignment policy acquired from the policy managing section 340, the position signals and the performance signals received from the launcher systems 200, and the detection signal received from the sensor system 100. An assignment signal showing a relation of the moving vehicles 10 and the launcher systems 200 assigned to the moving vehicles 10 is transmitted to the display section 350 and the launcher systems 200. Thus, the display section 350 displays the relation of the moving vehicles 10 and the launcher systems 200 assigned to the moving vehicles 10 as shown in FIG. 9. Also, each of the launcher systems 200 receives art assignment signal which contains the data of the assigned moving vehicle 10. Thus, each launcher system 200 can identify the moving vehicle 10 to be shot down.

When a change of the assignment policy to be displayed is instructed from the input section 360, the display changing function 720 is executed. Specifically, when the assignment policy B but ten 570 is selected from the input section 360 as shown in FIG. 10, the display changing function 720 is executed. As shown in FIG. 11B, the input section 360 generates and transmits display change signal 361 to the assigning section 330. Thus, the assignment processing 620-2 which is not under execution of the assignment processing acquires the selected assignment policy from the policy managing section 340. The assignment processing 620-2 by the assigning section 330 calculates the launcher systems 200 to which the moving vehicles 10 are assigned, by using the selected assignment policy. The calculated result is transmitted to the display section 350 by assignment signal. Thus, the display section 350 can display the relation of the moving vehicles 10 and the launcher systems 200 assigned to the moving vehicles 10 based on the selected assignment policy. Also, the assignment processing 620-1 by the assigning section 330 stops the transmission of the assignment signal to the display section 350. Thus, the display section 350 stops the display of the processing result of the assignment processing 620-1. Also, the assignment processing 620-1 by the assigning section 330 continues to transmit the assignment signal to the launcher systems 200. Thus, each launcher system 200 can identify the moving vehicle 10 to be shot down based on the calculation result using the assignment policy A.

When the change of the assignment policy is instructed to the assigning section 330 from the input section 360, the policy changing function 730 is executed. Specifically, the policy determining button 550 is selected by the input section 360, as shown in FIG. 10. Thus, the assignment policy used to calculate the launcher system 200 to be assigned with each moving vehicle 10 is changed to the assignment policy under display. In other words, the flying object 205 is launched based on the calculation result by using the assignment policy under display. A policy change signal 360 is transmitted so the assigning section 330 from the input section 360 as shown in FIG. 11B. The assignment processing 620-2 executed using the assignment policy under display transmits the processing result to the launcher system 200, too. On the other hand, the assignment processing 620-1 which has transmitted the assignment signal to the launcher system 200 stops the transmission of the assignment signal no the launcher system 200. Thus, the launcher system 200 can identify the moving vehicle 10 to be shot down based on the assignment signal received from the assignment processing 620-2.

When the moving vehicle 10 to be shot down reaches a predetermined position, the launcher system 200 launches the flying object 205, and transmits the launching signal to the assigning section 330 and the display section 350. The data showing that the flying object 205 has been launched and the number of flying objects 205 owned by the launcher system 200 are contained in the launching signal. In other words, when the assigning section 330 receives the launching signal, that is, when the flying object 205 is launched for the moving vehicle 10, the moving vehicle 10 toward for which the flying object 205 has been launched is excluded from the assignment object to the launcher system 200. Also, when receiving the number of flying objects 205 owned by the launcher system 200, the assigning section 330 updates the data of the launcher system 200.

Next, the processing of system will be described.

The sensor system 100 transmits data of the detected moving vehicles 10 and the flying objects 205 as the detection signal. The sensor system 100 continues to detect the moving vehicles 10 by radio wave transmitted continuously or intermittently. Thus, the moving direction and moving speed of the moving vehicle 10 are calculated from the position change of the detected moving vehicle 10. Therefore, the position, moving direction and moving speed of the moving vehicle 10 are contained in the detection signal transmitted from the sensor system 100.

The assigning section 350 carries out the processing of assigning the moving vehicles 10 to the launcher systems 200 as shown in FIG. 12A to FIG. 12D. Here, the assigning section 330 has an execution flag, a display flag, a calculation policy, an execution policy and a display policy. The execution flag shows whether or not the processing of assigning the moving vehicle 10 to the launcher system 200 is being carried out. The display flag shows whether or not the processing of displaying on the display section 350 is being carried out. The calculation policy shows the assignment policy used in the processing. The execution policy shows the assignment policy under execution. The display policy shows the assignment policy displayed on the display section 350. Specifically, it is supposed that the assignment policy under execution is the assignment policy A and the assignment policy under display is assignment policy B, as shown in FIG. 10. Also, it is supposed that the assignment processing 620-1 carries out the processing by using the assignment policy A and that the assignment processing 620-2 carries out the processing by using the assignment policy B. In this case, since the assignment processing 620-1 is processing the assignment policy under execution, data showing "execution" is stored in the execution flag. Also, since the assignment policy under display is not being processed, data showing "non-display" is stored in the display flag. Since the assignment policy used for processing is the assignment policy A, data showing the "assignment policy A" is stored in the calculation policy. Since the assignment policy under execution is the assignment policy A, the data showing the "assignment policy A" is stored in the execution policy. Since the assignment policy under display is the assignment policy B, the "assignment policy B" is stored in the display policy. On the other hand, in the assignment processing 620-2, "non-execution" is stored in the execution flag. The "display" is stored in the display flag. The "assignment policy A" is stored in the calculation policy. The "assignment policy A" and the "assignment policy B" are stored in the execution policy and the display policy, like the assignment processing 620-1.

Figure 12A:
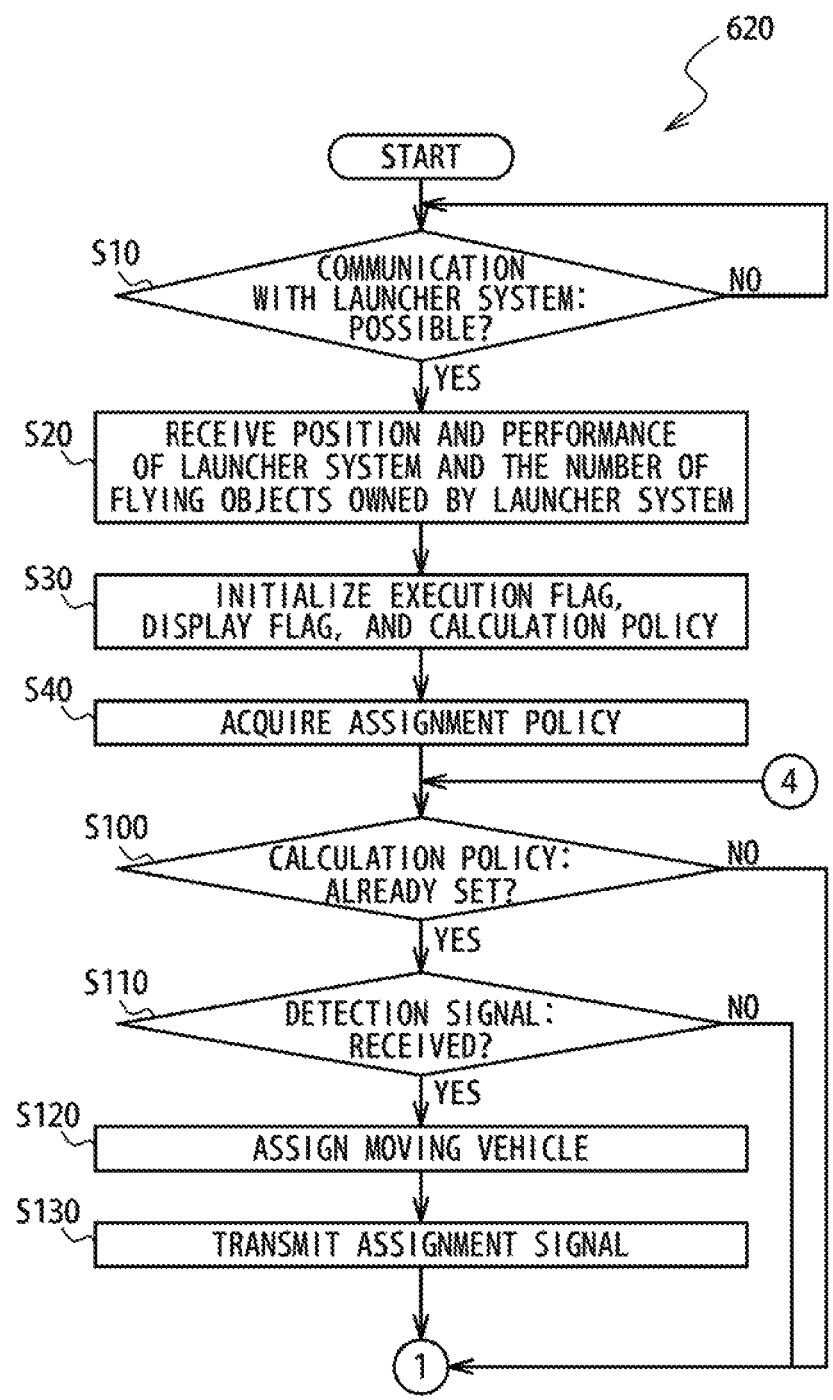
FIG. 12A is a flow chart showing processing of an assigning section of FIG. 6.

The assigning section 330 carries out the processing corresponding to the initial setting function 700 shown in the FIG. 11A. Specifically, the processing of steps S10 to S40 shown in FIG. 12A is carried out. Data necessary for the processing are acquired in the initial setting function 700 and the execution flag and so on are initialized.

The assigning section 330 checks whether or not being able to communicate with the launcher system 200 at step S10, as shown in FIG. 12A. This step is repeated until the communication with the launcher system 200 becomes possible.

Next, the assigning section 330 receives the position signals of the launcher systems 200 and the performance signals at step S20. Thus, the assigning section 330 acquires the positions of the launcher systems 200, the performances and the number of flying objects 205 owned by each launcher system 200.

Next, the assigning section 330 initializes the execution flag, the display flag and the calculation policy at step S30. In the assignment processing 620-1, the execution flag shows "execution" and the display flag shows "display". Also, the calculation policy shows a predetermined assignment policy. In the assignment processing 620-2, the execution, flag shows "non-execution", and the display flag shows "non-display". Also, the calculation policy is not set. In the initial state, the assignment policy to be executed and the assignment policy to be displayed are the same. Therefore, the processing of assigning the moving vehicle 10 is carried out in the assignment processing 620-1, and the calculation processing is not carried out in the assignment processing 620-2. Therefore, in the assignment processing 620-2, the calculation policy is not set.

At step S40, the assigning section 330 acquires the assignment policy from the policy managing section 340. The assigning section 330 carries out the calculation processing based on the set calculation policy. Therefore, the assigning section 330 acquires the assignment policy shown by the set calculation policy from the policy managing section 340.

The assigning section 330 acquires the assignment policy based on the set calculation policy. When the calculation policy shows the "assignment policy A", the assigning section 330 acquires the "assignment policy A" as the assignment policy. In other words, the assigning section 330 acquires the assignment policy shown by the calculation policy. When the calculation policy is not set, the assigning section 330 does not acquire the assignment policy.

Next, the processing corresponding to the target detecting function 710 shown in the FIG. 11A is carried out. Specifically, the assigning section 330 carries out the processing of steps S100 to S130 shown in FIG. 12A. In the target detecting function 710, the assigning section 330 carries out the processing of assigning the moving vehicles 10 detected by the sensor system 100 to the launcher systems 200.

As shown in FIG. 12A, the assigning section 330 checks whether or not the calculation policy has been set at step S100. When the calculation policy does not have been set, the assigning section 330 does not carry out the processing of assigning the moving vehicles 10. Therefore, when the calculation policy is not set, the assigning section 330 ends the processing of target detecting function 710 and the control advances to step S200.

At step S110, the assigning section 330 checks whether or not the detection signal has been received from the sensor system 100. The assigning section 330 does not carry out any processing when the sensor system 100 has not detected the moving vehicles 10 to be assigned. Therefore, when the detection signal has not been received, the assigning section 330 ends the target detecting function 710, and then the control advances to step S200.

At step S120, the assigning section 330 assigns the moving vehicles 10 acquired from the detection signal to the launcher systems 200 based on the acquired assignment policy. The condition to shoot down the moving vehicle 10 in a distant place, and so on have been set to the assignment policy. The assigning section 330 determines the launcher system 200 to which the moving vehicle 10 detected by the sensor system 100 is assigned, based on this condition. Also, the assigning section 330 calculates the launching point 512 as the position of the moving vehicle 10 when the launcher system 200 launches the flying object 205, based on the assignment policy. Also, the assigning section 330 calculates the meeting point 522 as a position expected that the moving vehicle 10 and the flying object 205 meet, based on the assignment policy.

At step S130, the assigning section 330 transmits the assignment signal to the display section 350 and the launcher system 200. When the display flag is "display", the assigning section 330 transmits the assignment signal to the display section 350, and when the display flag is "non-display", the assigning section 330 does not transmit the assignment signal to the display section 350. Also, when the execution flag is "execution", the assigning section 330 transmits the assignment signal to the launcher system 200, and when the execution flag is "non-execution", the assigning section 330 does not transmit the assignment signal to the launcher system 200. In other words, the assignment processing 620-1 or assignment processing 620-2 which carries out the processing to display on the display section 350 transmits the assignment signal to the display section 350. The assignment processing 620-1 or assignment processing 620-2 which actually carries out the processing of assigning the moving vehicle 10 to the launcher system 200 transmits the assignment signal to the launcher system 200. A combination relation 200 between the moving vehicle 10 and the launcher system to which the moving vehicle 10 has been assigned is contained in the assignment signal. When the sensor system 100 detects a plurality of moving vehicles 10, the sensor system 100 gives a moving vehicle identifier to each of the plurality of moving vehicles to identify the moving vehicles 10, and transmits the detection signal. Therefore, the assignment signal transmitted by the assigning section 330 contains the combination 200 of the moving vehicle identifier and the launcher system assigned with the moving vehicle 10 corresponding to the identifier. Also, the assignment signal contains the meeting point 522 calculated by the assigning section 330. The launcher system 200 launches the flying object 205 such that the flying object 205 meets the moving vehicle 10 at the meeting point 522. Moreover, the assignment signal contains the launching point 512 calculated by the assigning section 330. Therefore, the display section 350 extracts the meeting point 522 and the launching point 512 from the received assignment signal and displays the extracted points. Note that the launching point 512 is a position calculated by the assigning section 330 and is different from an actual position of the moving vehicle 10 when the launcher system 200 launches the flying object 205.

Next, the processing of the display changing function 720 shown in FIG. 11B is carried out. Specifically, the processing of steps S200 to S295 shown in FIG. 12B is carried out. The display changing function 720 is the processing of changing the display when the assignment, policy B button 570 is selected by the input section 360, as shown in FIG. 10.

As shown in FIG. 12B, at step S200, the assigning section 330 checks whether or not an instruction of the display change has been issued. In other words, the assigning section 330 confirms whether or not the assignment policy B button 570 has been selected by the input section 360. When not selected, the processing of display changing function 720 is ended so than the display is not changed, and the control advances to step S300.

At step S210, the assigning section 330 changes the display policy into the selected assignment policy. Thus, the assigning section 330 can confirm the assignment policy to be displayed on the display section 350.

At step S220, it is checked whether or not the execution flag shows "execution". Thus, it is confirmed whether or not the processing is carried out based on the assignment policy under the execution. For example, when the execution flag of the assignment processing 620-1 shows "execution", the assignment processing 620-1 shows the processing based on the assignment policy under execution. Next, at step S230 or S260, it is checked whether the assignment policy under execution after a change is the same as the assignment policy shown by the execution policy. In other words, it is confirmed whether or not the assignment policies under execution before and after the change are different.

When the execution flag shows "execution", it means that the processing is carried our based on the assignment policy under execution. When the assignment policy used to display on the display section 350 after the change (hereinafter, to be referred to as a displayed assignment policy) is the same as the assignment policy shown by the execution policy, the assignment policy to display after change is the same as the assignment policy under execution. Therefore, the assignment policy under execution before the change and the assignment policy displayed after the change are the same. Since the processing is carried out based on the assignment policy under execution, the display flag is changed, to the "display" at step S240.

When the execution flag shows "execution", it means that the processing is carried out based on the assignment policy under execution. When the assignment policy displayed after the change is different from the assignment policy shown by the execution policy, it means that the assignment policy under execution before the change and the assignment policy displayed after the change are different. Since the processing is carried out based on the assignment policy under execution, the display flag is changed to "non-display" at step S250.

When the execution flag shows "non-execution", it means that the processing is not carried out based on the assignment policy under execution. When the assignment policy displayed after the change is the same as the assignment policy shown by the execution policy, the assignment policy under execution before the change and the assignment policy displayed after the change mean the same. Since the processing is not carried out based on the assignment policy under execution, the display flag is changed, to "non-display" at step S270.

When the execution flag shows "non-execution", it means that the processing is not carried out based on the assignment policy under execution. When the assignment policy displayed after the change is different from the assignment policy shown by the execution policy, it means that the assignment policy under execution before the change and the assignment policy displayed after the change are different. Since the processing is not carried out based on the assignment policy under execution, the processing must be carried out using the assignment policy displayed after the change. Therefore, at step S280, the display flag is changed to "display". Also, at step S290, the calculation policy is changes to the display policy showing the policy displayed. Moreover, at step S295, the assigning section 330 acquires an assignment policy from the policy managing section 340 based on the calculation policy.

Next, the processing of the policy changing function 730 shown in FIG. 11B is carried out. Specifically, the processing of steps S300 to S340 shown in FIG. 12C is carried out. The policy changing function 730 changes to the processing of assigning the moving vehicle 10 to the launcher system 200 based on the displayed assignment policy. In other words, it is the processing when selecting the policy determining button 550 as shown in FIG. 10.

At step S300, the assigning section 330 checks whether or not the policy determining button 550 has been selected. When the policy selection button has not been selected, the processing of policy changing function 730 is ended since it is not necessary to change the assignment policy, and the control advances to step S400.

At step S310, it is checked whether or not the display flag is "display". When the display flag is the "display", the processing result is displayed on the display section 350. Therefore, at step S320, the execution flag is changed to "execution" to transmit the assignment signal to the launcher system 200. On the other hand, when the display flag is "non-display", the processing result is not displayed on the display section 350. Therefore, at step S330, the execution flag is changed to "non-execution" so as not to transmit the assignment signal to the launcher system 200.

At step S340, the assignment policy shown by the execution policy is changed to the assignment policy shown by the display policy. When the policy determining button 550 has been selected, the policy under execution is changed to the assignment policy displayed on the display section 350. Thus, the assignment policy shown by the execution policy shows the assignment policy under execution irrespective of the assignment policy executing the processing.

Figure 12D:
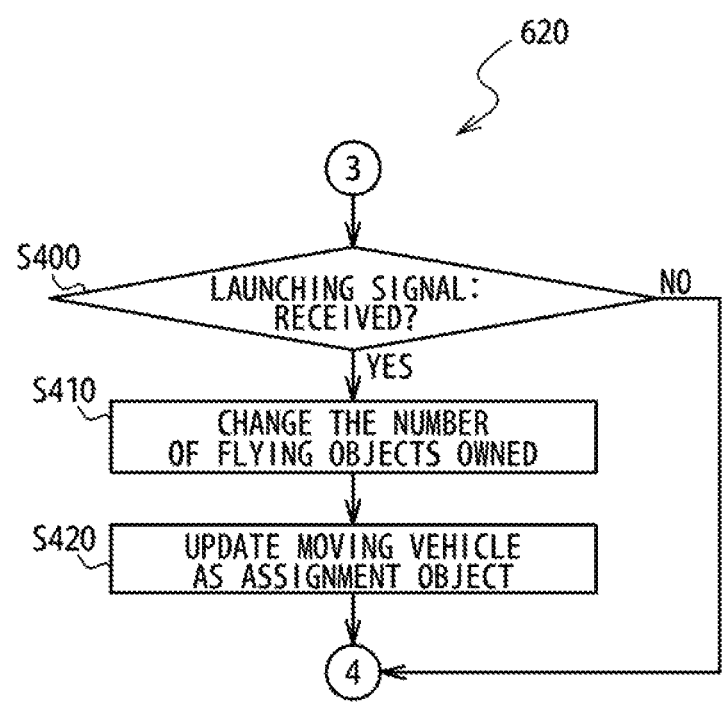
FIG. 12D is a flow chart showing processing of the assigning section of FIG. 6.

Next, the processing of the flying object launching function 740 shown in FIG. 11B is carried out. Specifically, the processing of steps S400 to S420 shown in FIG. 12D is carried out. The flying object launching function 740 updates the data of the launcher system 300 which is stored in the assigning section 330 when the launcher system 200 launches the flying object 205.

At step S400, the assigning section 330 checks whether or not the launching signal has been received from the launcher system 200. When not receiving the launching signal, the processing of the flying object launching function 740 is ended since the launcher system 200 has not launched the flying object 205. As a result, the control returns to step S100 and is repeated. When the launching signal has been received, the control advances to step S410.

At step S410, the number of flying objects 205 owned by the launcher system 200 is changed. The number of flying objects 205 owned by the launcher system 200 is contained in the launching signal. Therefore, the assigning section 330 changes the number of flying objects 205 owned by the launcher system 200 based on the received number of flying objects 205.

At step S420, the moving vehicle 10 assigned by the assignment processing 620 is updates. The moving vehicle identifier of the moving vehicle 10 as a shoot-down object is contained in the launching signal. Therefore, to prevent a plurality of flying objects 205 from being launched for the same moving vehicle 10, the moving vehicle 10 for which the flying object 205 has been launched is excluded from the assignment object.

Figure 13:
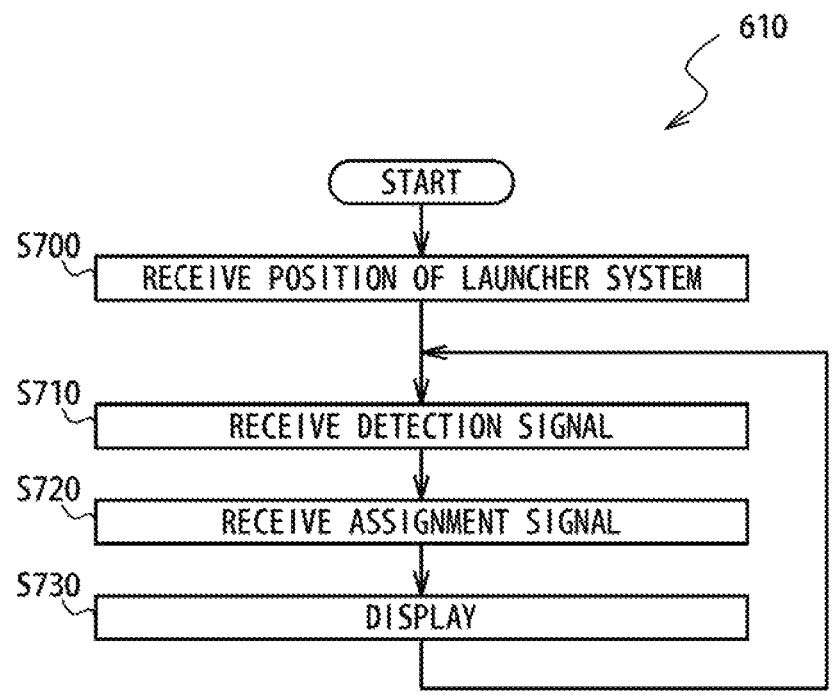
FIG. 13 is a flow chart showing processing of the display section of FIG. 6.

The display section 350 receives data to foe displayed from the launcher system 200 and the assigning section 330 as shown in FIG. 13, and displays on the display screen 500 as shown in FIG. 9.

The display section 350 carries out the processing of the initial setting function 700 shown in the FIG. 11A. Specifically, the display section 350 carries out the processing of step S700 shown in FIG. 13. In the initial setting function 700, a position signal is received from the launcher system 200.

At step S700, the display section 350 receives the position signal of the launcher system 200. The position data of the launcher system 200 is contained in the position signal. Therefore, the display section 350 acquires the launcher system position 520 as a position of the launcher system 200.

The display section 350 carries out the same processing, i.e. the processing of displaying the moving vehicle 10 and so on in the target detecting function 710, the display changing function 720, the policy changing function 730 and the flying object launching function 740 shown in the FIG. 11A. Specifically, the display section 350 carries out the processing of steps S700 to S730 shown in FIG. 13.

At step S710, the display section 350 receives the detection signal from the sensor system 100. The position data of the moving vehicle 10 and the flying object 205 are contained in the detection signal. Therefore, the display section 350 acquirers the moving vehicle position 510 as the position of the moving vehicle 10 and the flying object position 530 as the position of the flying object 205.

At step S720, the display section 350 receives the assignment signal from the assigning section 330. The data showing the combination of the moving vehicle 10 and the launcher system 200 assigned to the moving vehicle 10 is contained in the assignment signal. In other words, the combination of the moving vehicle 10 and the launcher system 200 is shown. Also, data showing the meeting point 522 and the launching point 512 are contained in the assignment signal. Therefore, the display section 350 acquires data showing a combination of the moving vehicle 10, the launcher system 200, the meeting point 522 and the launching point 512.

At step S730, the display section 350 displays the acquired data on the display screen 500 as shown in FIG. 9. The display section 350 displays the launcher system position 52 acquired from the launcher system 200. Also, the display section 350 displays the moving vehicle position 510 and the flying object position 530 which are acquired from the sensor system 100. Moreover, the display section 350 displays the meeting point 522 and the launching point 512. The display section 350 displays the combination of the moving vehicle position 510 and the meeting point 522 according to the combination of the moving vehicle 10 and the meeting point 522, which are acquired. For example, the display section 350 displays a line segment having the moving vehicle position 510 and the meeting point 522 at the both ends, as shown in FIG. 9. Also, the display section 350 displays the combination of the launcher system position 520 and the meeting point 522 according to the combination of the launcher system 200 and the meeting point 522. For example, the display section 350 displays a line segment having the launcher system position 520 and the meeting point 522 as the both ends as shown in FIG. 9. Thus, the launcher system position 520 and the moving vehicle position 510 are displayed as the both ends of the line segment through the meeting point 522. In other words, the relation of the launcher system 200 and the moving vehicle 10 is shown.

Figure 14:
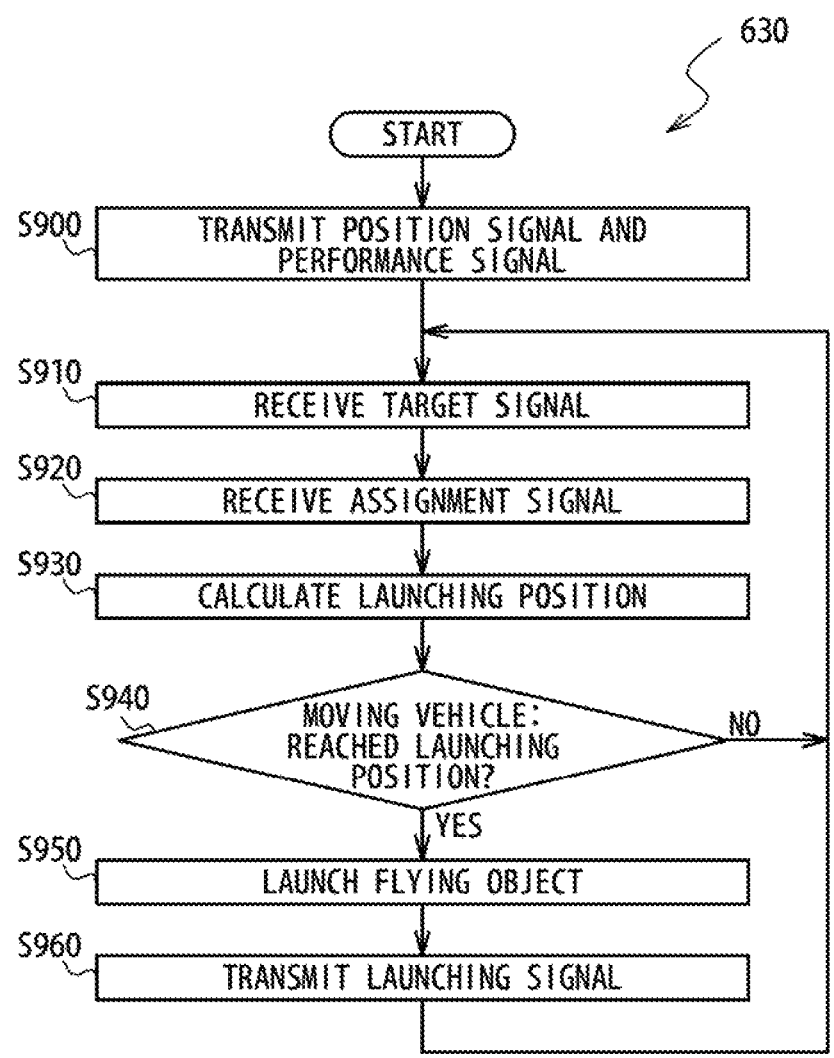
FIG. 14 is a flow chart showing processing of a launcher system of FIG. 6.

The launcher system 200 launches the flying object 205 for the assigned moving vehicle 10. As shown in FIG. 14, to launch the flying object 205 for the moving vehicle 10, the launcher system 200 receives the assignment signal and the target signal from the assigning section 330.

The launcher system 200 carries out the processing of the initial setting function 700 shown in the FIG. 11A. Specifically, the launcher system 200 carries out the processing of step S900 shown in FIG. 14. At step S900, the launcher system 200 transmits the position signal and the performance signal. Data showing the current position of the launcher system 200 is contained in the position signal. The launcher system 200 acquires the current position by using the GPS signal transmitted from the artificial satellite. The launcher system 200 transmits the position signal which contains the acquired current position data.

The launcher system 200 carries out the same processing in the target detecting function 710, the display changing function 720, and the policy changing function 730 which are shown in FIG. 11A and FIG. 11B. Specifically, the launcher system 200 carries out the processing of steps S910 to S940 shown in FIG. 14.

As shown in FIG. 14, at step S910, the launcher system 200 receives the target signal from, the assigning section 330. Data shoving the position, moving direction of and moving steed of the moving vehicle 10 are contained in the target signal. Thus, the launcher system 200 acquires the data showing the position, moving direction and moving speed of the moving vehicle 10.

At step S920, the launcher system 200 receives the assignment signal from the assigning section 330. Data showing the combination of the moving vehicle 10, the launcher system 200 assigned to the moving vehicle 10 and the meeting point 522 is contained in the assignment signal. Thus, the launcher system 200 acquires data showing the assigned moving vehicle 10, i.e. the moving vehicle 10 to be shot down. Also, the launcher system 200 acquires the data showing the meeting point 522 as the position for the moving vehicle 10 to be shot down.

At step S930, the launcher system 200 calculates the position of the moving vehicle 10 when the flying object 205 should be launched, and the launching position. The launcher system 200 calculates a flight time taken by reaching the meeting point 522 after the flying object 205 is launched, based on the position of the launcher, the meeting point 522 and the performance of the flying object 205. The launcher system 200 calculates the launching position as the position of the moving vehicle 10 by the calculated flight time before the meeting time of the moving vehicle 10 and the flying object 205 which is calculated from the position, moving direction and moving speed of the moving vehicle 10. The moving vehicle 10 reaches the meeting point 522 from the calculated launching position in the flight time. Therefore, when the moving vehicle 10 reaches the launching position, the launcher system 200 launches the flying object 205 so that the moving vehicle 10 and the flying object 205 meet at the meeting point 522.

At step S940, the launcher system 200 checks whether or not the moving vehicle 10 has reached the calculated launching position. When not reaching, the control returns to step S910 to repeat the same processing. When reaching, the control advances to step S950, and launcher system 200 carries out the processing of launching the flying object 205.

Next, the launcher system 200 carries cot the processing of launching the flying object 205, i.e. the processing or the flying object launching function 740 shown in FIG. 11B. Steps S950 and S960 shown in FIG. 14 correspond to the processing of the flying object launching function 740.

At step S950, the launcher system 200 launches the flying object 205 for the moving vehicle 10. Next, at step S960, the launcher system 200 transmits the launching signal. Data showing the moving vehicle 10 to be shot down and the number of flying objects 205 owned by the launcher system 200 is contained in the launching signal.

Each system operates at mentioned above, so that the assignment policy of assigning the moving vehicle 10 to the launcher system 200 can be changed in real time according to change of situation. Also, the display section 350 displays the change of situation which is based on the current assignment policy and the change of situation when the assignment policy is changed, in real time. Therefore, the operator can change the assignment policy after confirming the situation when changing the assignment policy.

Second Embodiment

In the first embodiment, an example has been shown in which the current situation is displayed in real time and the assignment policy is changed. In a second embodiment, a situation after a specified time passes (hereinafter, to be referred to as a "predicted situation") is displayed in addition to the current situation.

The configuration of the interception system which contains the target assignment system 1 according to the second embodiment will be described.

Figure 15:
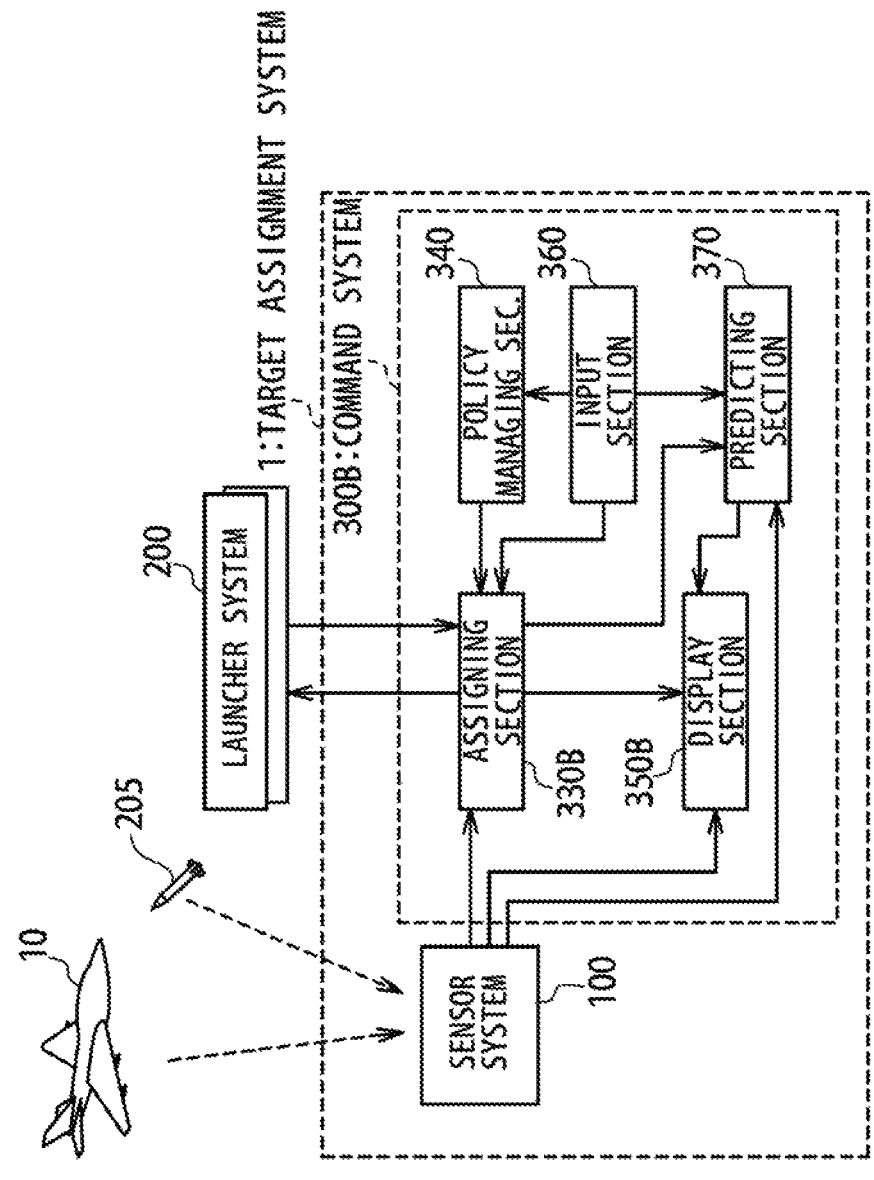
FIG. 15 is a functional block diagram showing the interception system according to a second embodiment.

As shown in FIG. 15, the interception system includes the sensor system 100, the launcher systems 200 and the command system 300B, like the first embodiment. In addition to the configuration of the first embodiment, the command system 300B has a predicting section 370. Also, the processing of an assigning section 330B and the processing of a display section 350B are different in a part from those in the first embodiment. Besides, the interception system of the second embodiment operates like that of the first embodiment.

The predicting section 370 receives the assignment signal from the assigning section 330B, calculates a predicted situation and transmits the calculation result to the display section 350B. In other words, the predicting section 370 calculates the positions of the moving vehicle 10 and the flying object 205 after a specified time passes. Also, the predicting section 370 calculates a situation that the assigned launcher system 200 launches the flying object 205 when the moving vehicle 10 has reached the launching point 512. In other words, the predicting section 370 predicts the position of the launched flying object 205 in case that the assigned launcher system 200 launches the flying object 205.

Next, the operation of displaying the calculation result by the predicting section 370 on the display section 350B will be described.

Figure 16:
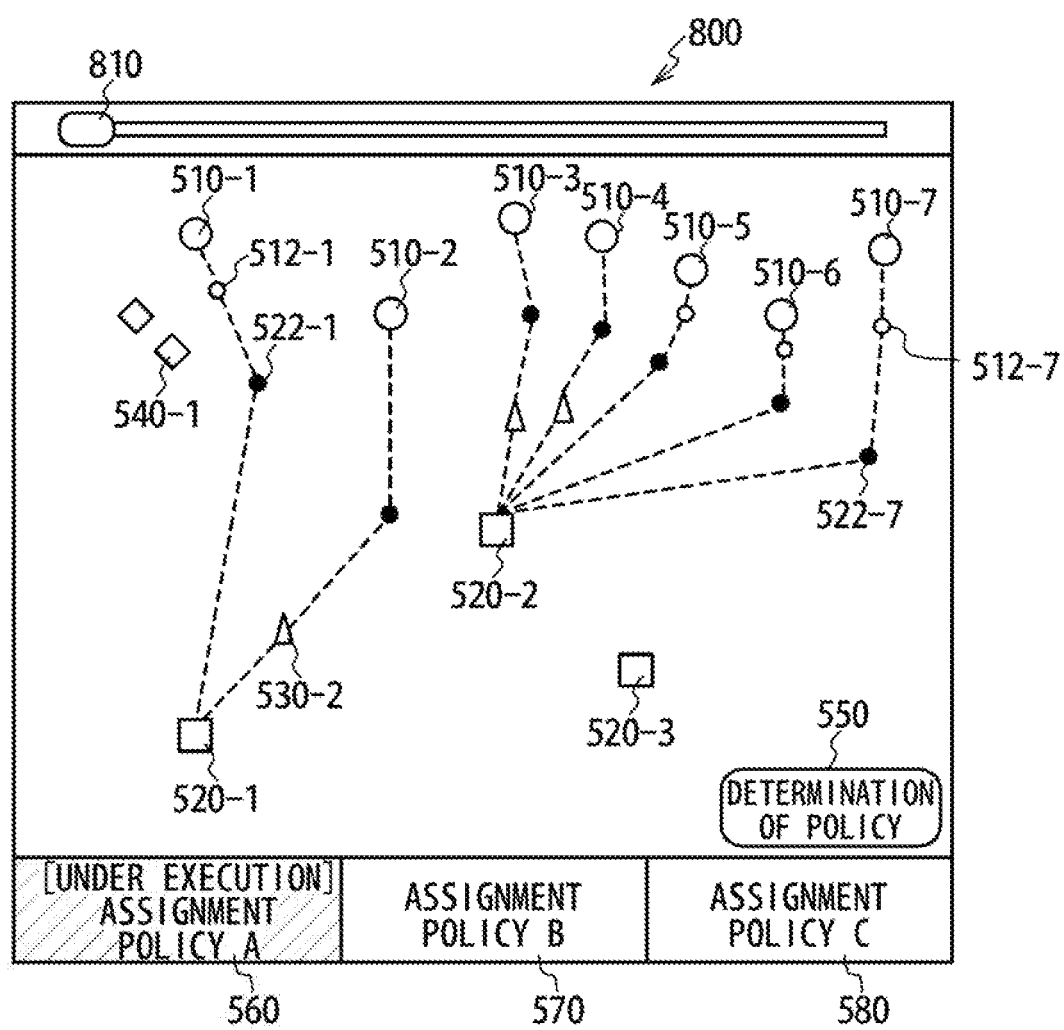
FIG. 16 is an example of display screen displayed on the display section of FIG. 15.
Figure 17:
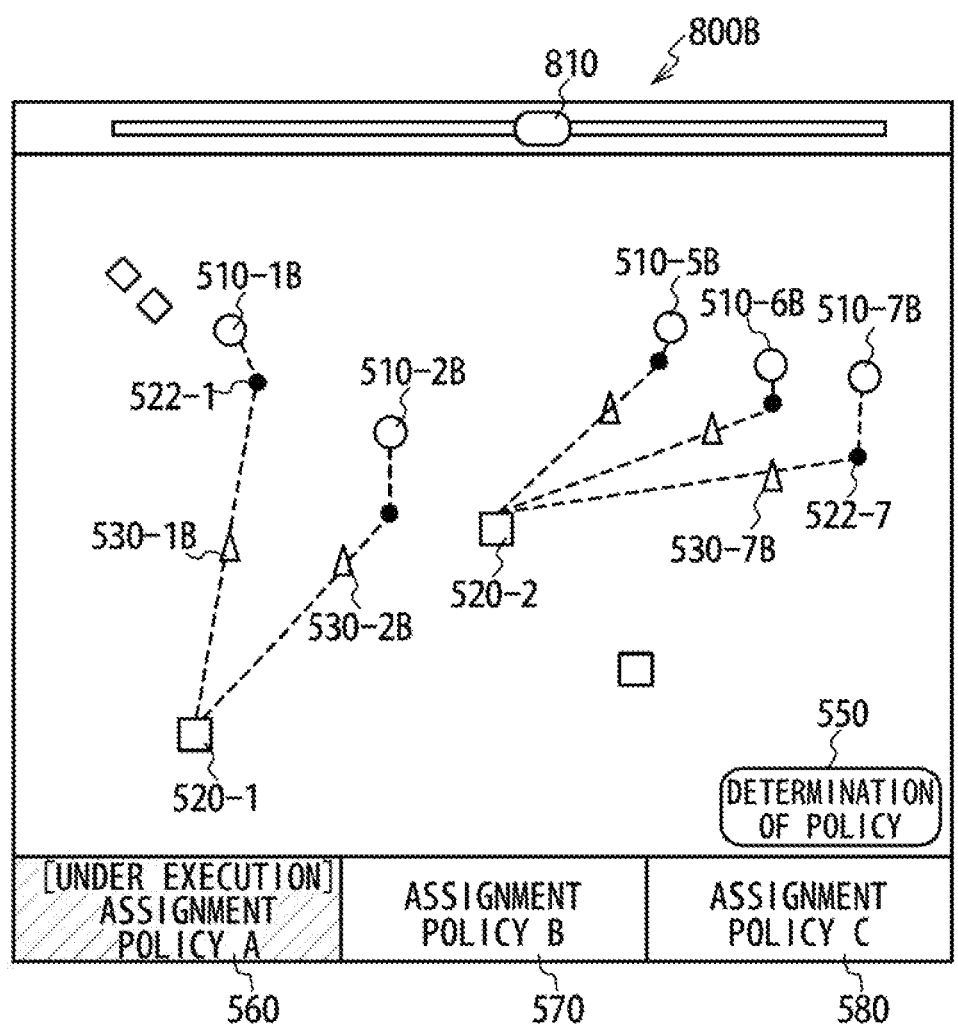
FIG. 17 is an example of display screen displayed on the display section of FIG. 15.

As shown in FIG. 16, the display section 350B displays a setting slider 810 arranged in the top portion of a display screen 800 to specify a display time. By selecting and moving this setting slider 810 to either side, the display section 350B displays a situation after a time specified by setting slider 810 passes, as shown in FIG. 17. The display section 350B displays the current situation when the setting slider 810 is moved to the left end of the display screen 800. The display section 350B displays a situation after a longer time passes as setting slider 810 is moved to the right direction on the display screen 800. For example, the display seed on 350B displays a situation 10 minutes after the setting slider 810 is moved to the right end. The display section 350B displays a situation 5 minutes after the setting slider 810 is moved to the center of the display screen 800.

Thus, the operator can check a situation after a specified time passes even when the assignment policy is changed. In other words, the operator can check a predicted situation in a future in addition to the current situation, and change the launcher system 200 assigned with the moving vehicle 10.

Next, the operation of the interception system will be described. First, the cooperation among the respective systems will be described.

Figure 18B:
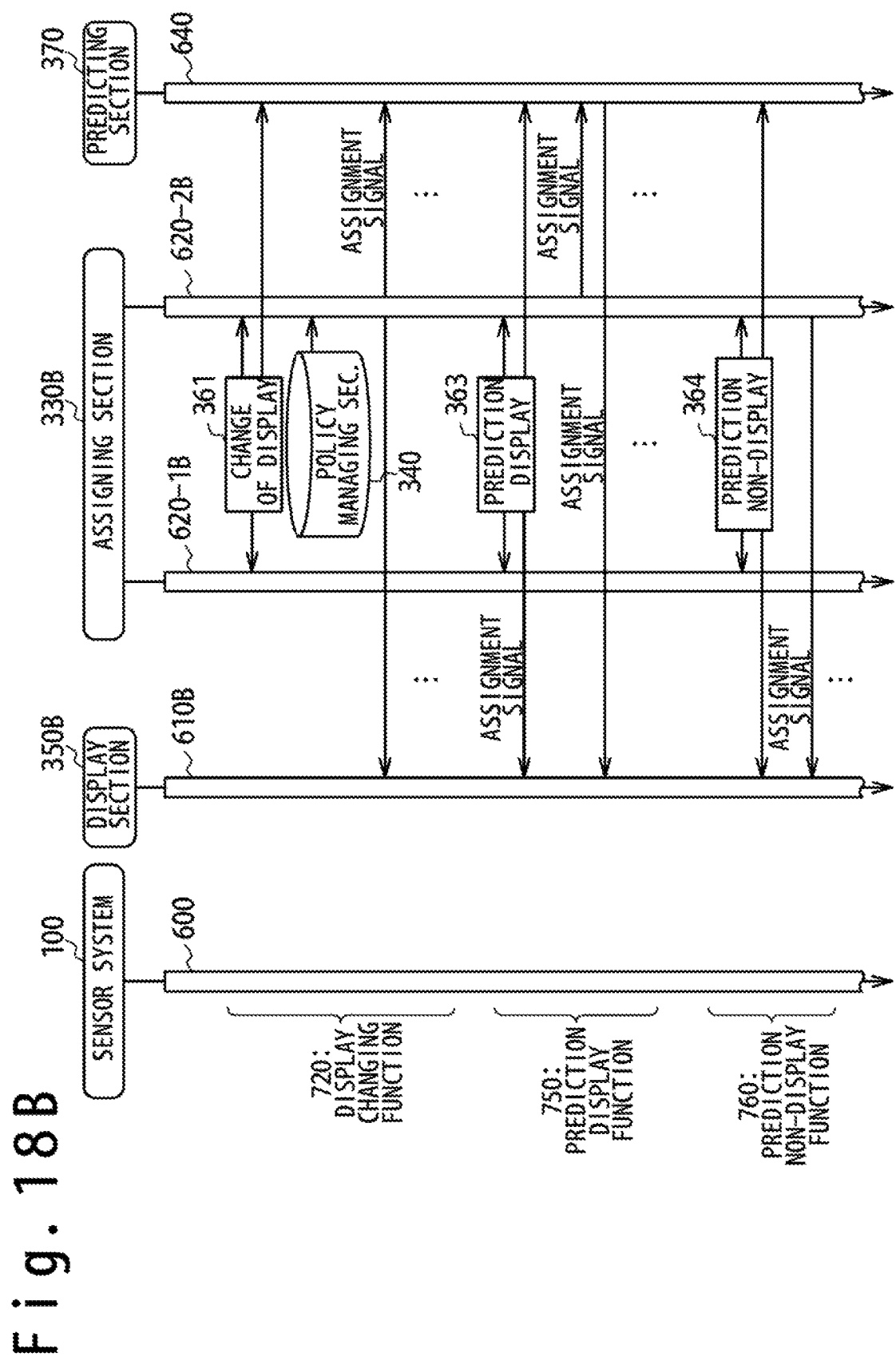
FIG. 18B is a sequence diagram showing cooperation among systems in the interception system according to the second embodiment.
Figure 19A:
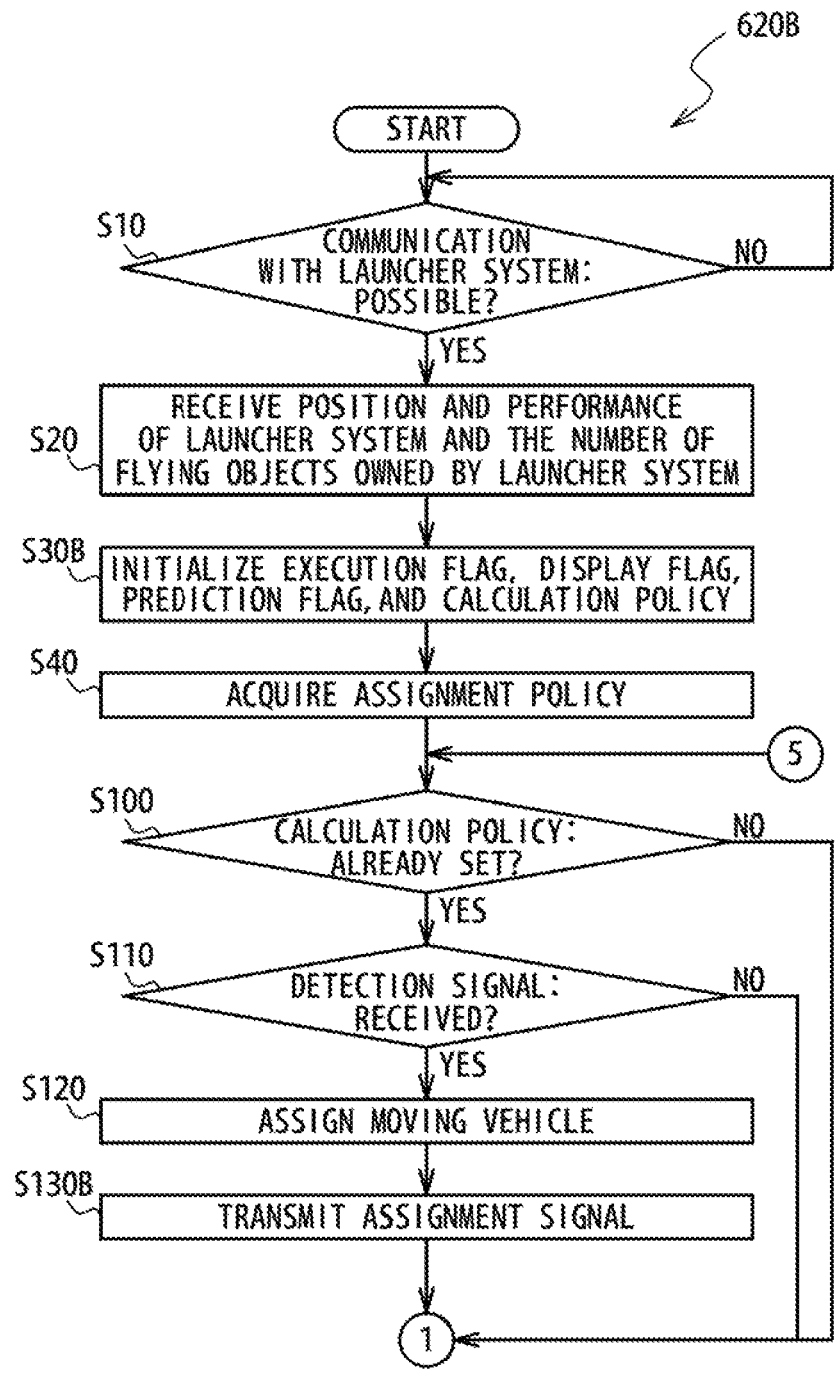
FIG. 19A is a flow chart showing processing of the assigning section of FIG. 1.
Figure 19C:
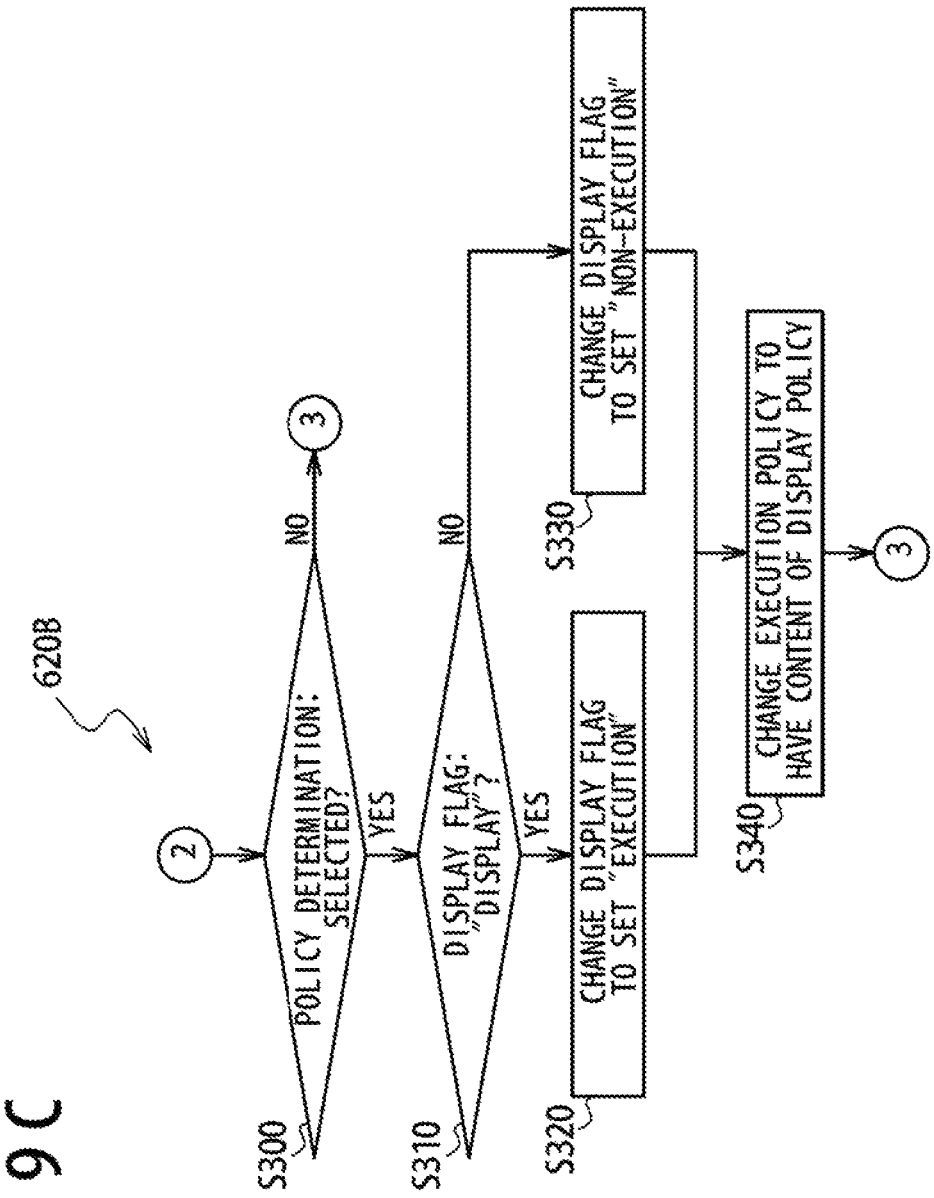
FIG. 19C is a flow chart showing processing of the assigning section of FIG. 15.
Figure 19D:
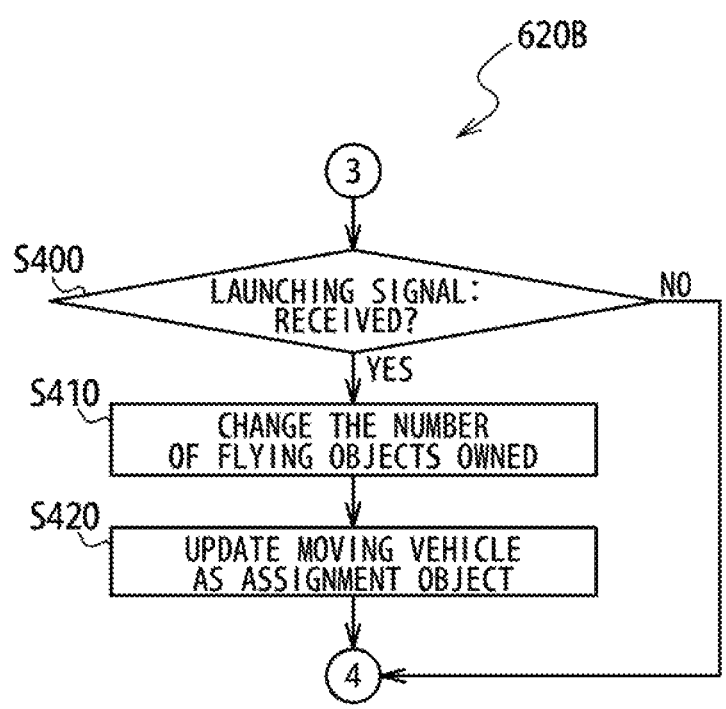
FIG. 19D is a flow chart showing processing of the assigning section of FIG. 15.
Figure 19E:
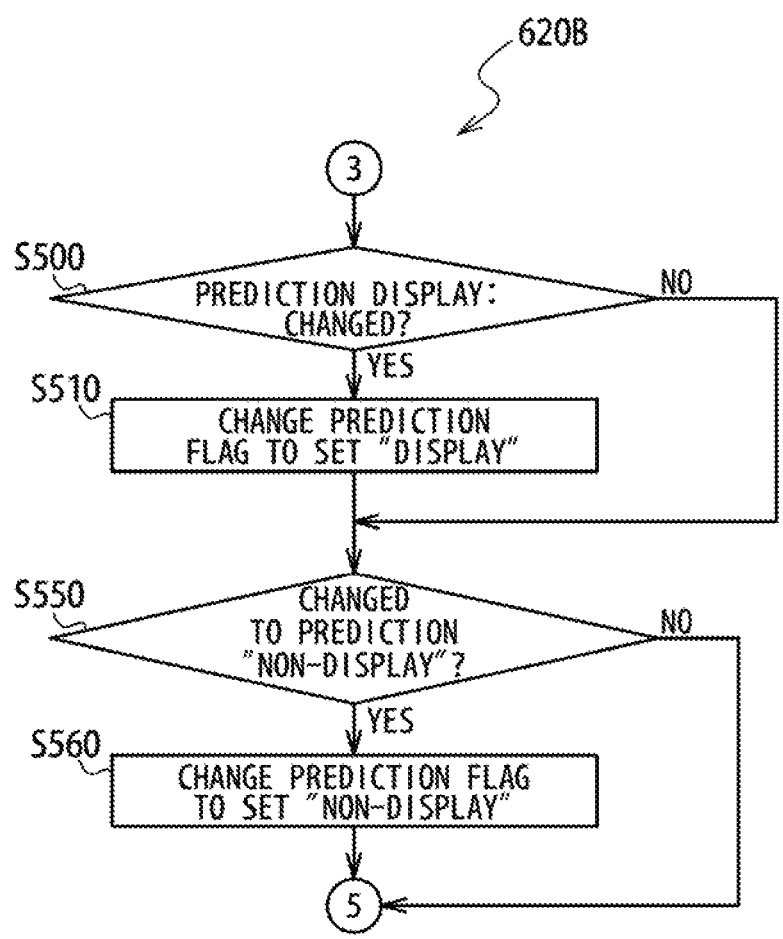
FIG. 19E is a flow chart showing processing of the assigning section of FIG. 15.

As shown in FIG. 18A and FIG. 18B, transmission and reception of data are carried out among the sensor system 100, the display section 350B, the assigning section 330B and the predicting section 370 in the interception system. Also, since the operation of the launcher system 200 is same as that of the first embodiment, the description is omitted.

As shown in FIG. 18A, the initial setting function 700 is first executed in the interception system. The assigning section 330B acquires the assignment policy from the policy managing section 340. Also, like the first embodiment the launcher system 200 transmits the position signal to the assigning section 330 and the display section 350.

The target detecting function 710 is executed when the sensor system 100 detects the moving vehicles 10. In the target detecting function 710, the detected moving vehicles 10 are assigned to the launcher systems 200 and the result is displayed on the display section 350. The sensor system 100 transmits the detection signal showing the detected moving vehicles 10 to the display section 350B, the assigning section 330B and the predicting section 370. The assigning section 330B assigns the detected moving vehicles 10 to the launcher systems 200 based on the acquired assignment policy.

When the change of the displayed assignment policy is instructed from the input section 360, the display changing function 720 is executed like the first embodiment.

Moving the setting slider 810, the prediction display function 750 is executed. The setting slider 810 is moved according to an input from the input section 360. In other words, the input section 360 transmits a signal for displaying a predicted situation as a prediction display signal 363 to the assigning section 330B, the predicting section 370 and the display section 350B. The predicting section 370 receives the assignment signal from the assigning section 330B and acquires the combination of the moving vehicle 10 and the launcher system 200 assigned with the moving vehicle 10. Also, the predicting section 370 receives the detection signal from the sensor system 100 and acquires the data showing the position, moving direction and moving speed of the moving vehicle 10. Thus, the predicted situation can be calculated. The predicting section 370 transmits the calculated result to the display section 350B as the assignment signal. The display section 350B carries out a displaying operation based on the received assignment signal. Thus, in the prediction display function 750, the display section 350 displays a situation after an instructed time passes.

Moving the setting slider 810 to the left end, the prediction non-display function 760 is executed. The setting slider 810 moves to the left end according to the input from the input section 360. In other words, the input section 360 transmits a signal for setting a prediction non-display situation to the assigning section 330B, the predicting section 370 and the display section 350B, as a prediction non-display signal 364. The display section 350B does not receive the assignment signal from the predicting section 370 and receives the assignment signal from the assigning section 330B. Thus, the display section 350B displays the current situation in real time.

Next, the processing of each system will be described. Since the sensor system 100 and the launcher system 200 carry out the same processing except for signal transmission destinations, the description is omitted.

The assigning section 330B carries out the processing of assigning the moving vehicle 10 to the launcher system 200 as shown in FIG. 19A to FIG. 19E. Also, when the predicting section 370 transmits the assignment signal to the display section 350B, the assigning section 330B operates so that the assigning section 330B does not transmit the assignment signal to the display section 350B. Here, the assigning section 330B holds the execution flag, the display flag, the calculation policy, the execution policy and the display policy, like the first embodiment. Moreover, the assigning section 330B holds a prediction flag. The prediction flag shows whether or not the display section 350B is displaying a predicted situation. When the prediction flag shows "display", the display section 350B displays the predicted situation. When the prediction flag shows "non-display", the display section 350B displays the current situation. In other words, when the prediction flag shows "display", the assigning section 330B does not transmit the assignment signal to the display section 350B. When the prediction flag is "non-display", the assigning section 330B transmits the assignment signal to the display section 350B.

The assigning section 330B is similar to that of the first embodiment, as shown in FIG. 19A to FIG. 19E. Therefore, the processing different from the first embodiment will be described.

The assigning section 330B carries out the processing of the initial setting function 700 of FIG. 18A. Specifically, the assigning section 330B carries out the processing of steps S10 to S40 shown in FIG. 19A. In the second embodiment, since the prediction flag is added, the assigning section 330B carries out the processing of initial setting function of the prediction flag at step S30B. Therefore, the prediction flag is set to "non-display". Other kinds of processing are same as the first embodiment.

Next, the assigning section 330B carries out the processing of target detecting function 710 shown in FIG. 18A. Specifically, the assigning section 330B carries out the processing of steps S100 to S130 shown in FIG. 19A. Here, at step S130B, the assigning section 330B transmits the assignment signal to the display section 350B, the launcher system 200 and the predicting section 370. The assigning section 330B transmits to the display section 350B when the display flag shows "display" and the prediction flag snows "non-display". Except for this case, the assigning section 330B does not transmit the assignment signal to the display section 350B. Specifically, the assigning section 330B does not transmit the assignment signal to the display section 350B when the display flag is "non-display" or the prediction flag is "display". The assigning section 330B transmits to the predicting section 370 when the prediction flag is "display". Other kinds of processing are same as the first embodiment.

Next, the assigning section 330B carries out the processing of display changing function 720 shown in FIG. 18B. Specifically, the assigning section 330B carries cot the processing of steps S200 to S295 shown in FIG. 19B. When the display section 350B displays a predicted situation refers a display change, the assigning section 330B changes the display section 350B to display the current situation. Therefore, the assigning section 330B adds step S205 to the processing in the first embodiment, and changes the prediction flag into "non-display". Thus, the prediction flag shows "non-display". Therefore, one basing the display flag of "display" of the assignment processing 620-1B and the assignment processing 620-2B transmits the assignment signal to the display section 350B. Other kinds of processing are same as the first embodiment.

Next, the assigning section 330B carries out the processing of policy changing function 730 like the first embodiment. Specifically, the assigning section 330B carries out the processing of steps S300 to S340 shown in FIG. 19C. This processing is same as the first embodiment.

Next, the assigning section 330B carries out the processing of flying object launching function 740 like the first embodiment. Specifically, the assigning section 330B carries out the processing of steps S400 no S420 shown in FIG. 19D. Thus processing is same as the first embodiment.

Next, the assigning section 330B carries out the processing of prediction display function 750. Specifically, the assigning section 330B carries out the processing of steps S500 to S510 shown in FIG. 19E. Thus, the assigning section 330B stops the transmission of the assignment signal to the display section 350B.

At step S500, the assigning section 330B checks whether or not a change to the prediction display has been carried out. In other words, the assigning section 330B confirms whether or not the assigning section 330B has received a prediction display signal 363 from the input section 360. When having not received the prediction display signal 363, the processing of prediction display function 750 is ended, and the control advances to step S550. When having received the prediction display signal 363, the control advances to step S510, and the assigning section 330B changes the prediction flag into "display". Thus, the assigning section 330B stops transmission of the assignment signal to the display section 350B.

Next, the assigning section 330B carries out the processing of prediction non-display function 760. Specifically, the assigning section 330B carries out the processing of steps S550 to S560 shown in FIG. 19E. Thus, the assigning section 330B transmits the assignment signal to the display section 350B.

At step S550, the assigning section 330B checks whether or not a change to the prediction non-display has been carried out. In other words, the assigning section 330B confirms whether or not the assigning section 330B has received a prediction non-display signal 364 from the input section 360. When having not received the prediction non-display signal 364, the processing of prediction non-display function 760 is ended, and the control returns to step S100 to repeat the above-mentioned processing. When having received the prediction non-display signal 364, the control advances to step S560 and the assigning section 330B changes the prediction flag to "non-display". Thus, the assigning section 330B transmits the assignment signal to the display section 350B. After that, the control returns to step S100 to repeat the processing.

Figure 20:
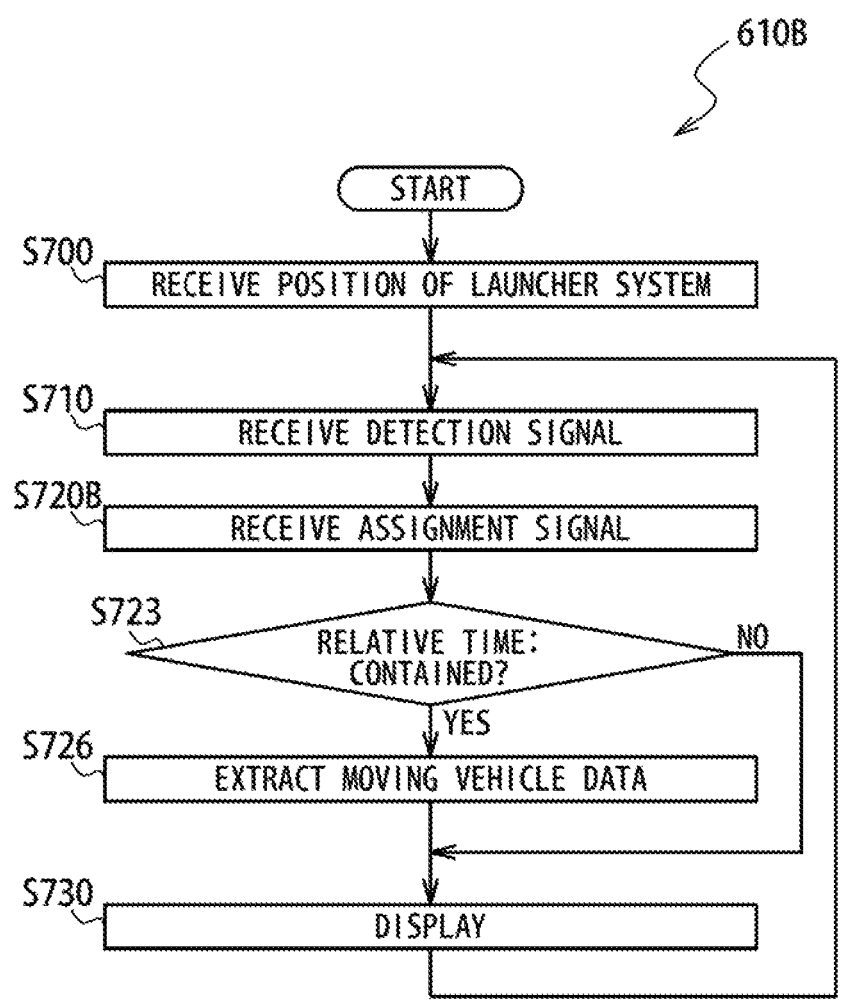
FIG. 20 is a flow chart showing processing of the display section of FIG. 15.

The display section 350B receives data to be displayed from the launcher system 200, the assigning section 330B and the predicting section 370 as shown in FIG. 20, and displays on the display screen 800 as shown in FIG. 16.

The display section 350B carries out the processing of initial setting function 700 shown in FIG. 18A. Specifically, the display section 350B carries out the processing of step S700 shown in FIG. 20. The processing of initial setting function 700 is same as that of the first embodiment.

The display section 350B carries out similar processing except for the initial setting function 700 shown in FIG. 18A and FIG. 18B. Specifically, the display section 350B carries out the processing of steps S710 to S730 shown in FIG. 20.

At step S710, the display section 350B receives the detection signal from the sensor system 100 like the first embodiment.

At step S720B, the display section 350B receives the assignment signal from the assigning section 330B or the predicting section 370. When having received from the assigning section 330B, the display section 350B operates in the same way as in the first embodiment. When receiving from the predicting section 370 relative time, i.e. a time of the predicted situation to be displayed is contained in the assignment signal. Also, data, showing the positions of the moving vehicle 10 and the flying object 205 are contained.

Next, at step S723, it is checked whether or not the relative time is contained in the assignment signal. Thus, it is possible to confirm from which of the assigning section 330B and the predicting section 370 the assignment signal has been received. When the relative time is not contained in the assignment signal, the control advances to step S730 and the current situation is displayed like the first embodiment. When the relative time is contained in the assignment signal, the control advances to step S726.

At step S726, the moving vehicle data is extracted from the assignment signal. In other words, the positions of the moving vehicle 10 and the flying object 205 are acquired from the assignment signal. The positions of the moving vehicle 10 and the flying object 205 were acquired from the assignment signal. The positions of the moving vehicle 10 and the flying object 205 acquired from the detection signal are changed to the positions of the moving vehicle 10 and the flying object 205 acquired from the assignment signal. Thus, the moving vehicle 10 and the flying object 205 received from the predicting section 370 are displayed.

At step S730, the received data are displayed on the display screen 800. This processing is same as in the first embodiment.

In this way, the display section 350B receives from one of the assigning section 330B and the predicting sections 370 and displays the current situation or the predicted situation.

Figure 21A:
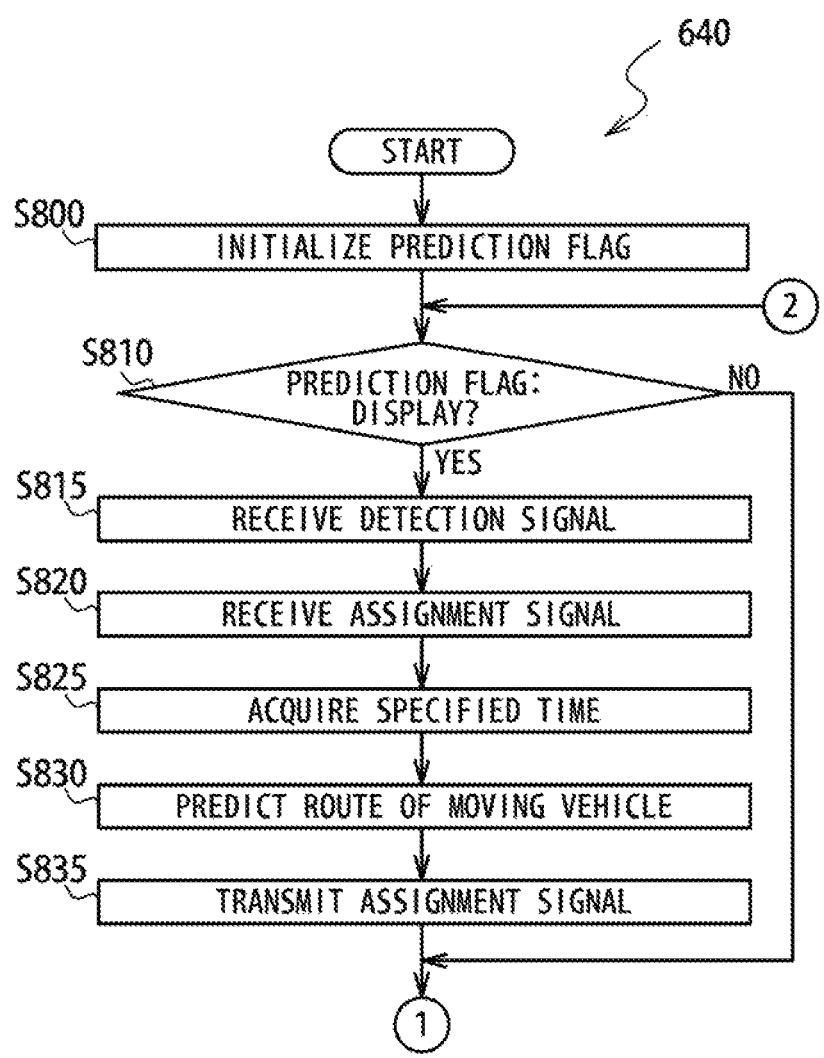
FIG. 21A is a flow chart showing processing of an estimating section of FIG. 15.
Figure 21B:
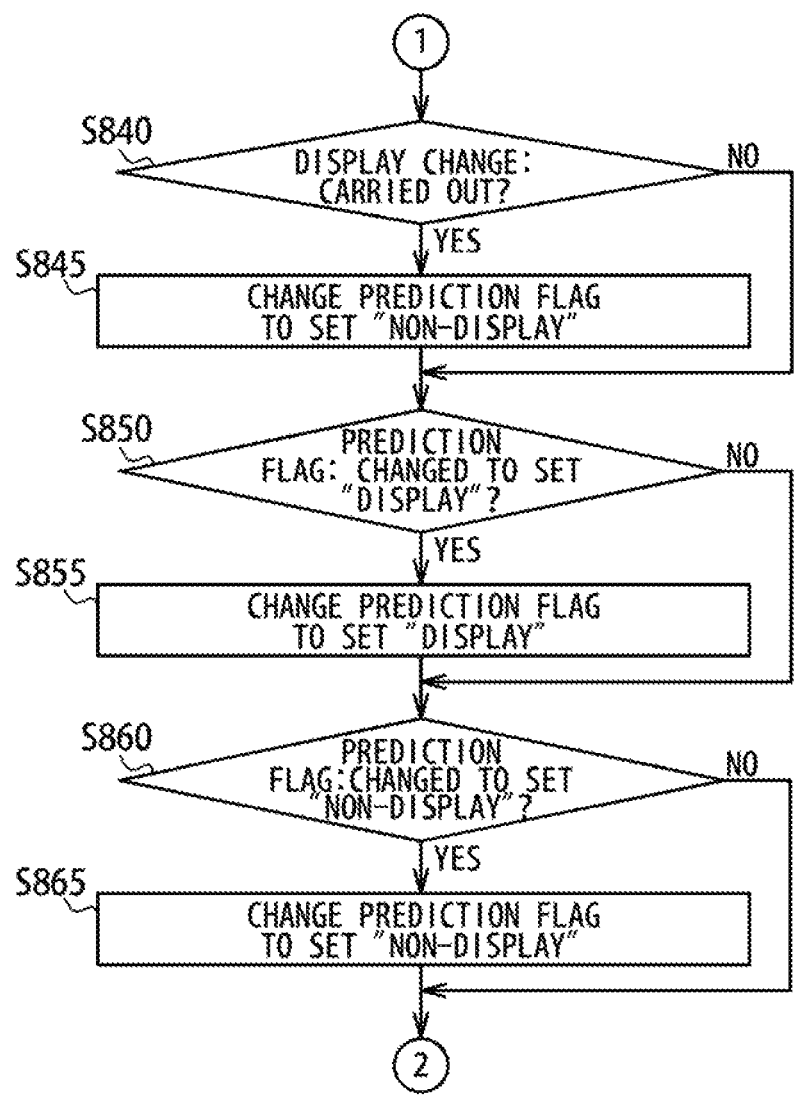
FIG. 21B is a flow chart showing processing of the estimating section of FIG. 15.

The predicting section 370 receives data from the sensor system 100 and the assigning section 330B as shown in FIG. 21A and FIG. 21B and calculates a situation after a specified time elapse. The predicting section 370 transmits the calculated result to the display section 350B as the assignment signal.

The predicting section 370 carries out the processing of initial setting function 700 shown in FIG. 18A. In other words, as shown in FIG. 21A, at step S800, the prediction flag is initialized. Specifically, the prediction flag is set to "non-display". The prediction flag shows "display" when displaying the predicted situation like the assigning section 330B. When displaying the current situation, the prediction flag shows "non-display". In other words, when the prediction flag is "display", the predicting section 370 transmits the assignment signal to the display section 350B. When the prediction flag is "non-display", the predicting section 370 does not transmit the assignment signal to the display section 350B.

Next, the predicting section 370 carries out the processing of target detecting function 710 shown in FIG. 18B. Specifically, the predicting section 370 carries out the processing of steps S810 to S825 shown in FIG. 21A. At step S810, when the prediction flag is "non-display", the processing of target detecting function 710 is ended, because, the predicting section 370 does not transmit the assignment signal to the display section 350B. When the prediction flag is "display", the control advances to step S815 to transmit the assignment signal to the display section 350B.

At step S815, the predicting section 370 receives the detection signal from the sensor system 100. The predicting section 370 acquires the position, moving direction and moving speed of the moving vehicle 10. Also, the predicting section 370 acquires the position, moving direction and moving speed of the flying object 205.

At step S820, the predicting section 370 receives the assignment signal from the assigning section 330B. Thus, the predicting section 370 acquires the combination of the moving vehicle 10 and the launcher system 200 assigned to the moving vehicle 10. Also, the predicting section 370 receives the meeting point 522 and the launching point 512. In other words, the predicting section 370 acquires the combination of the moving vehicle 10, the launcher system 200, the meeting point 522 and the launching point 512.

At step S825, the predicting section 370 acquires a time specified based on an input to the input section 360. In other words, the predicting section 370 acquires the time of the predicted situation to be displayed.

At step S830, the predicting section 370 predicts a flight route of the moving vehicle 10. The predicting section 370 predicts the flight route of the moving vehicle 10 based on the moving direction of and the moving speed which have been acquired from the sensor system 100. The prediction of this flight route may be the same as the method used when the moving vehicle 10 is assigned to the launcher system 200. The predicting section 370 calculates the position of the moving vehicle 10 after the time acquired at step S825 passes, based on the predicted flight route. When the moving vehicle 10 reaches the launching point 512 but does not reach the meeting point 522, the predicting section 370 determines that the launcher system 200 to be used has launched the flying object 205 for the moving vehicle 10. In this case, the predicting section 370 calculates the position, of the launched flying object 205 based on a time period from the time when the moving vehicle 10 has reached the launching point 512 to the time when data is acquired. When the moving vehicle 10 has reached the meeting point 522, the moving vehicle 10 is not displayed, supposing that the moving vehicle 10 has met the flying object 205 at the meeting point 522. In other words, the position of the moving vehicle 10 is not contained in the assignment signal. In this way, the predicting section 370 calculates the position of the moving vehicle 10 and the position of the flying object 205 in the predicted situation and adds data showing the calculated positions to the assignment signal. As a result, the combination of the position of the moving vehicle 10, the position of the flying object 205, the launcher system 200, the meeting point 522 and the launching point 512 is contained in the assignment signal.

At step S835, the predicting section 370 transmits the assignment signal to the display section 350B.

In this way, the predicting section 370 can transmit the assignment signal to the display section 350B in case of the target detecting function 710.

Next, the predicting section 370 carries out the processing of display changing function 720 shown in FIG. 18B. Specifically, the predicting section 370 carries out the processing of steps S840 to S845 shown in FIG. 21B.

At step S840, the predicting section 370 checks whether or not the display change has been carried out. In other words, the predicting section 370 confirms whether or not the display change signal 361 has been received from the input section 360. When having not been received, the processing of display changing function 720 is ended. When having received, the control advances to step S850.

At step S845, the predicting section 370 changes the prediction flag to "non-display". In other words, the predicting section 370 stops the transmission of the assignment signal to the display section 350B. After the display change, to display the current situation, the display section 350B receives the assignment signal from the assigning section 330B.

Next, the predicting section 370 carries out the processing of prediction display function 750 shown in FIG. 18B. Specifically, the predicting section 370 carries out the processing of steps S850 to S855 shown in FIG. 21B.

At step S850, the predicting section 370 checks whether or not a change to the prediction display has been carried out. In other words, the predicting section 370 confirms whether or not the prediction display signal 363 has been received from the input section 360. When having not received, the processing of prediction display function 750 ends. When having received, the control, advances to step S855.

At step S855, the predicting section 370 changes the prediction flag to set "display". Thus, the predicting section 370 transmits the assignment signal to the display section 350B.

Next, the predicting section 370 carries out the processing of prediction non-display function 760. Specifically, the predicting section 370 carries out the processing of steps S860 to S865 shown in FIG. 21B.

At step S860, the predicting section 370 checks whether or not a change to prediction non-display has been carried out. In other words, the predicting section 370 confirms whether or not the prediction non-display signal 364 has been received from the input section 360. When having not received, the processing of prediction non-display function 760 is ended, and the control returns to step S810 to repeat the same processing. When having received, the control advances to step S865.

At step S865, the predicting section 370 changes the prediction flag to set "non-display". Thus, the predicting section 370 stops the transmission of the assignment signal to the display section 350B.

In this way, the predicting section 370 calculates the situation after a specified time passes so as to display on the display section 330B. Therefore, the operator can confirm a situation expected when the assignment policy is changed, in addition to the assignment policy under execution.

Third Embodiment

An example has been shown in which the launcher system 200 assigned with the moving vehicle 10 is changed by changing the assignment policy in the first and second embodiments. In a third embodiment, an example is shown in which the launcher system 200 assigned with the moving vehicle 10 is changed manually.

Figure 22:
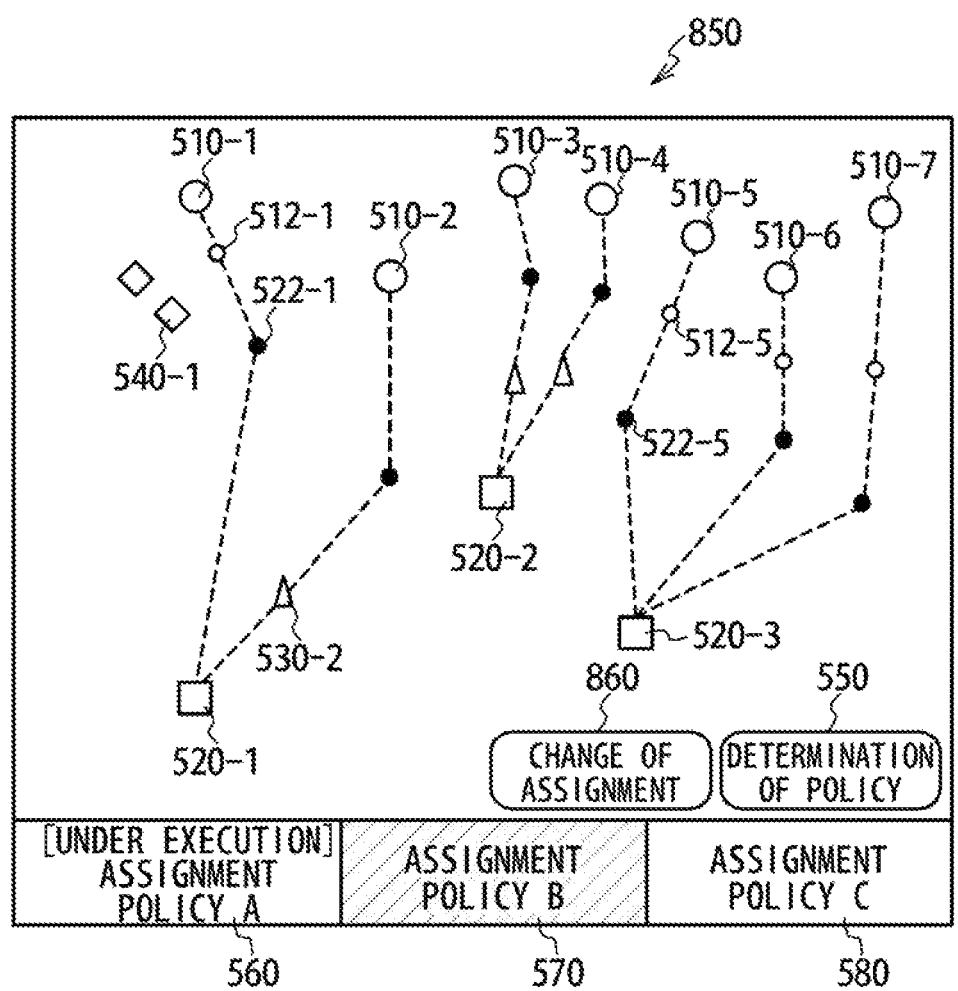
FIG. 22 is an example of display screen showing the interception system according to a third embodiment.
Figure 23:
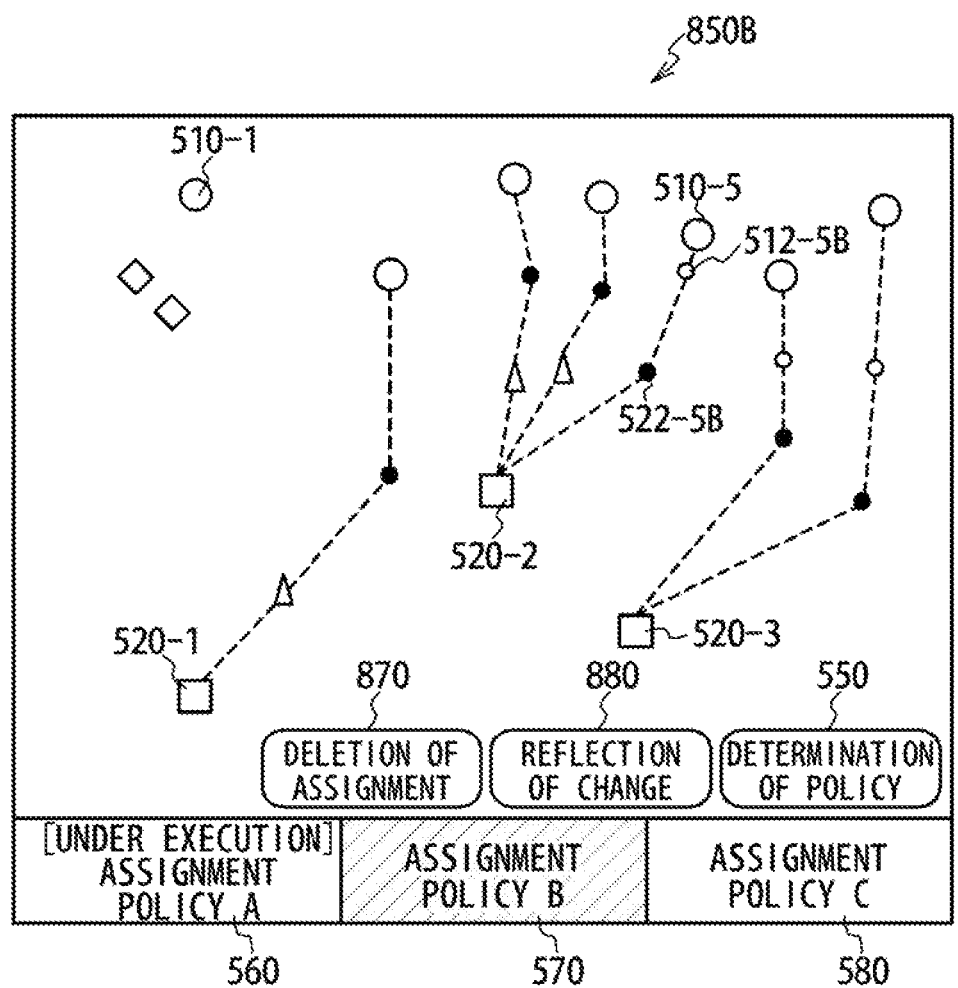
FIG. 23 is a screen example displayed in the interception system according to too third embodiment.
Figure 24A:
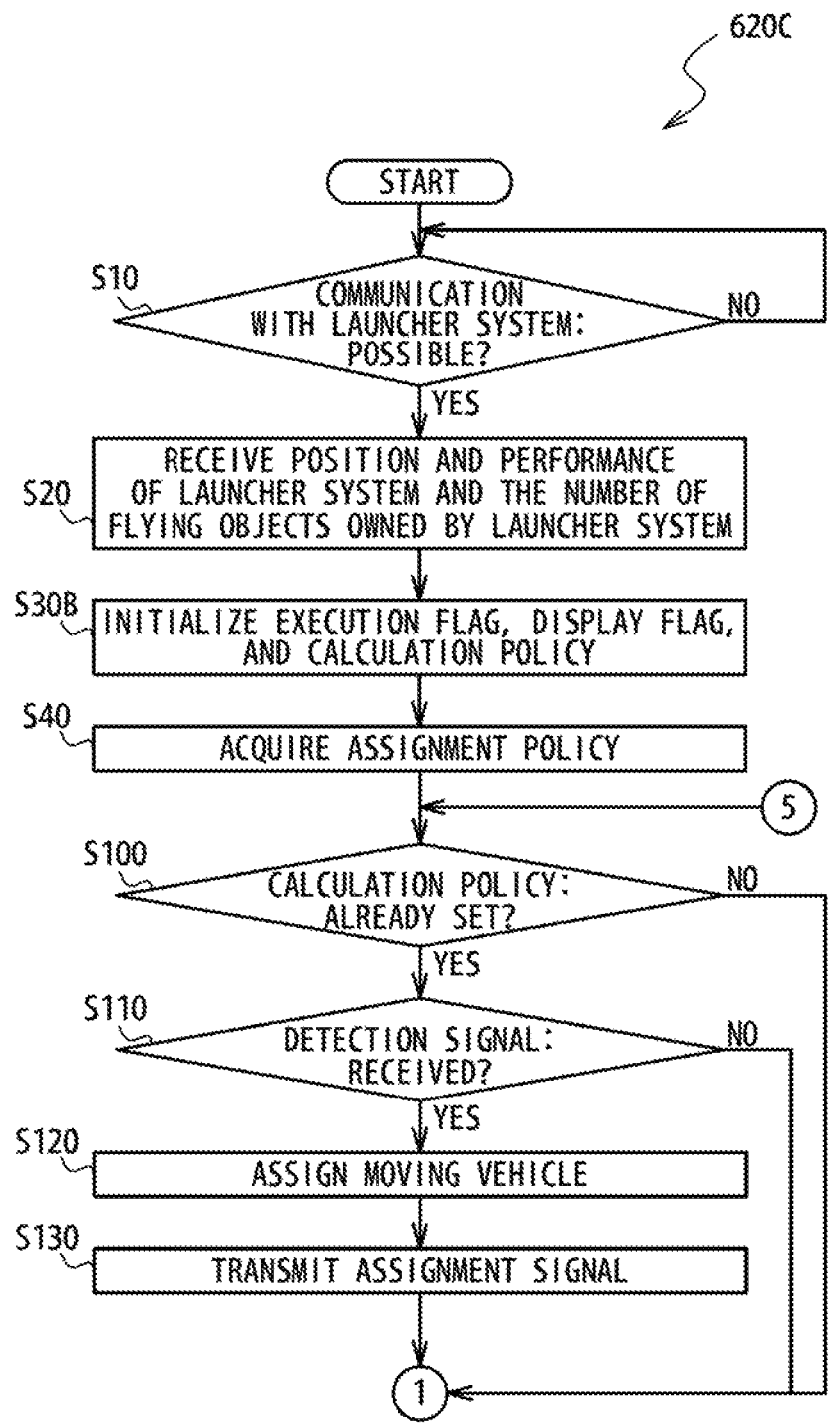
FIG. 24A is a flow chart showing processing of the assigning section of the interception system according to the third embodiment.
Figure 24D:
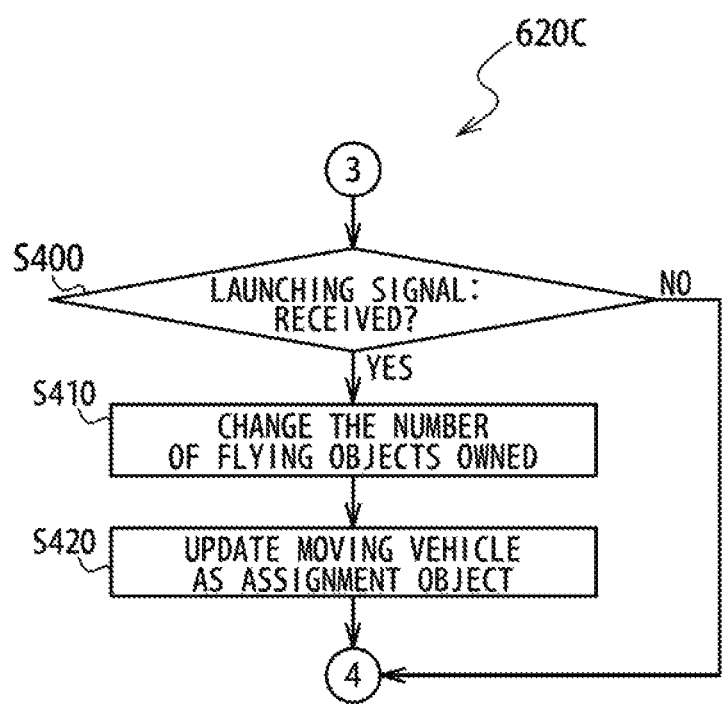
FIG. 24D is a flow chart showing processing of the assigning section of the interception system according to the third embodiment.
Figure 24E:
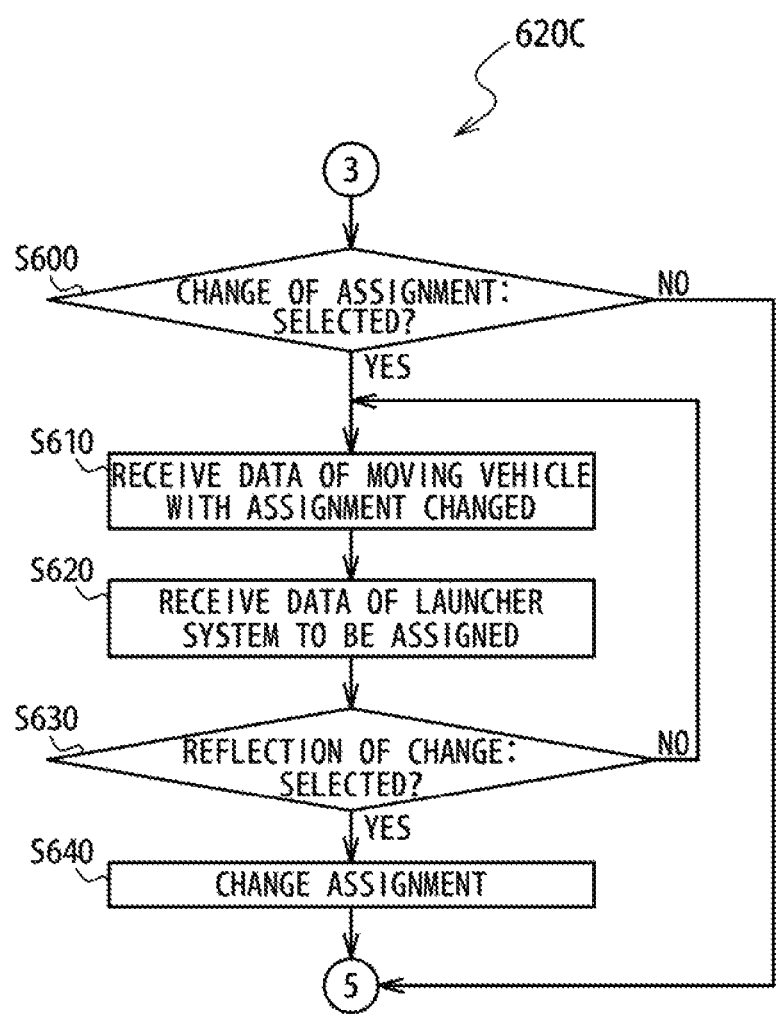
FIG. 24E is a flow chart showing processing of the assigning section of the interception system according to the third embodiment.

As shown in FIG. 22, the display section 350C displays data on the display screen 850. An assignment change button 860 is displayed on the display screen 850. When the assignment change button 860 is selected through the input section 360, the display section 350C advances to the assignment change state. Specifically, the display section 350C displays data on the display screen 850B as shown in FIG. 23. An assignment deletion button 870 and a change reflection button 880 are displayed on the display screen 850B. By selecting the moving vehicle 10 and the launcher system 200 assigned with the moving vehicle 10 on the display screen 850B, the moving vehicle 10 is assigned to the launcher system 200. For example, the launcher system position 520 of the launcher system 200 to be assigned may be selected after the moving vehicle position 510 of the moving vehicle 10 is selected. Also, when the assignment of the moving vehicle 10 should be deleted, the moving vehicle 10 is selected and then the assignment deletion button 870 is selected. At last, to reflect the change result, a change reflection button 880 is selected. In this way, the launcher system 200 assigned with the moving vehicle 10 is changed in response to an input from the input section 360. According to the result of change of the assignment, the meeting point 522 and the launching point 512 are displayed.

The third embodiment and the first embodiment are same in the configuration but differ from in the processing of the assigning section 330C. The processing of the assigning section 330C will be described.

The assigning section 330C carries out the processing of assigning the moving vehicle 10 to the launcher system 200 as shown in FIG. 24A to FIG. 24E. Also, the launcher system 200 assigned to the moving vehicle 10 is changed in response to an input to the input section 360. Since the processing of steps S10 to S420 is same as that, in the first embodiment, the description is omitted.

At step S600, the assigning section 330C checks whether or not the assignment change button 860 has been selected. When the assignment change button 860 is selected, the input section 360 generates the assignment signal to transmit to the assigning section 330C. Therefore, the assigning section 330C checks whether or not the assignment change signal has been received. When having not received the assignment change signal, the control returns to step S100 to repeat the same processing. When having received the assignment change signal, the control advances to step S610.

At step S610, the assigning section 330C receives data showing the moving vehicle 10 for the assignment to be changed. The input section 360 transmits the moving vehicle identifier of the moving vehicle 10 to the assigning section 330C as a change object when the data showing the moving vehicle 10 for the assignment to be changed is inputted. The assigning section 330C receives the moving vehicle identifier of the moving vehicle 10 and the data showing the moving vehicle 10 for the assignment to be changed is acquired.

At step S620, the assigning section 330C receives data showing the launcher system 200 to be assigned. When the data showing the launcher system 200 assigned with the moving vehicle 10 to be changed is inputted, the input section 360 transmits the data showing the launcher system 200 to be assigned to the assigning section 330C. Thus, the assigning section 330C acquires the data showing the launcher system 200 to be assigned with the moving vehicle 10.

At step S630, the assigning section 330C checks whether or net the change reflection button 880 has been selected. When the change reflection button 880 is selected, the input section 360 transmits an assign reflection signal, to the assigning section 330C. Therefore, the assigning section 330C confirms whether or not the assignment reflection signal has been received. When having not received the assignment reflection signal, the control returns to step S610 and the same processing is repeated. When having received the assignment reflection signal, the control advances to step S640 to change the launcher system 200 to be assigned with the moving vehicle 10.

In this way, the operator can manually change the launcher system 200 to be assigned with the moving vehicle 10. Therefore, the assignment can fee changed freely, as in case of using another interception system to shoos down the moving vehicle 10, in case of carrying cut an assignment which is different from the assignment policy, and so on.

Fourth Embodiment

Figure 25:
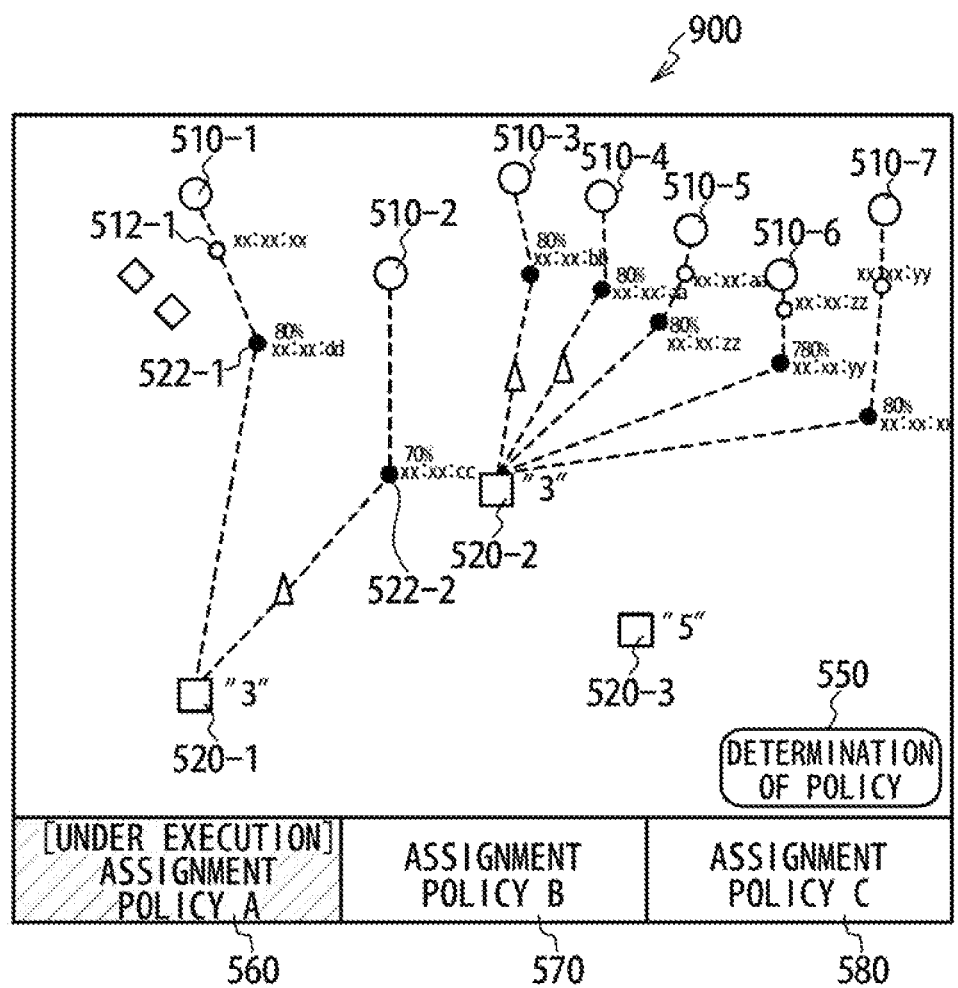
FIG. 25 is an example of display screen displayed in the interception system according to a fourth embodiment.

In a fourth embodiment, the display section 350 displays data on the display screen 900 as shown in FIG. 25. The meeting time of the moving vehicle 10 and the flying object 205 is displayed at a meeting point 522 on the display screen 900. Also, the time when the moving vehicle 10 reaches the launching point 512 is displayed at a launching point 512. Also, a probability that the flying object 205 shoots down the moving vehicle 10 may be calculated, based on historical interception records, a simulation result, and so on and the probability may be displayed. The assigning section 330 calculates these data to acid to the assignment signal. The display section 350 extracts the meeting time and so on from the assignment signal and displays them. Also, the number of flying objects 205 owned by the launcher system 200 is displayed on the display screen 900. Also, the loaded number of flying objects 205 may be displayed.

Figure 26:
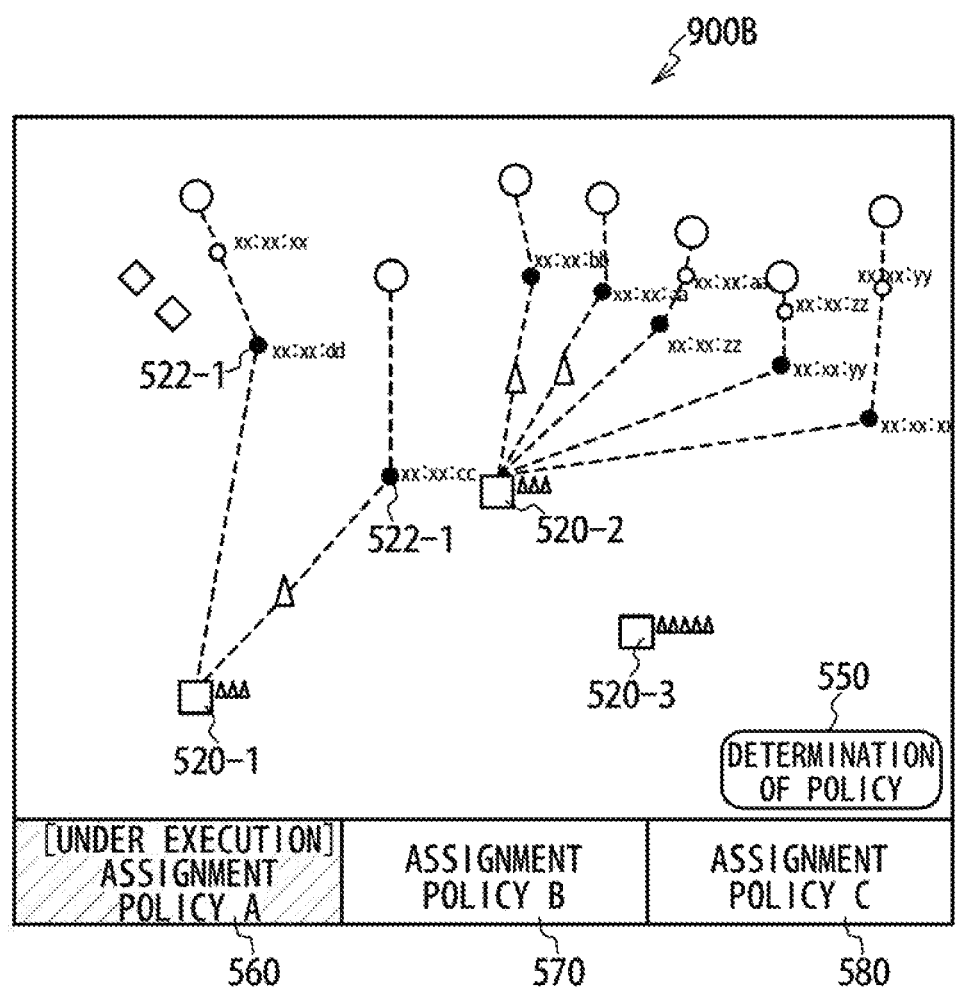
FIG. 26 is an example of display screen displayed in the interception system according to the fourth embodiment.

As shown in FIG. 26, the display color of the meeting point 522 may be changed according to the probability that the flying object 205 shoots down the moving vehicle 10, without displaying the shooting-down probability. Also, the number of the flying objects 205 owned by the launcher system 200 may be displayed by using the number of diagrams as shown in FIG. 26. Also, the display of the meeting time and so on may be displayed only a part.

Modification Example in the above embodiments, an example that the setting of the calculation policy is not cancelled after being set has been shown, but it is not limited to these embodiments. When processing is carried out by using the assignment policy not displayed after the policy determining button 550 is selected, the processing of target detecting function 710 may not be carried out. In this case, the calculation policy may be cancelled at step S270 of FIG. 12B and step S330 of FIG. 12C. Thus, the processing of target detecting function 710 is not executed by using the assignment policy which is not executed and is not displayed.

In the above embodiments, an example that the assigning section 330 carries out the assignment processing 620-1 and the assignment processing 620-2 in parallel has been shown but the present invention is not limited to this. For example, as one piece of processing, display processing and execution processing may be carried out. Also, another piece of processing for every assignment policy may be carried out in parallel.

In the above embodiments, the assigning section 330 and the predicting section 370 generate the same assignment signal to transmit to the launcher system 200 and the display section 350. However, the present invention is not limited to this. For example, the assignment signal may be generated to contain only the data necessary to launch the flying object 205 and transmitted to the launcher system 200. Also, the display signal of the assignment signal may be generated to contain only the data necessary to display the combination relation of the moving vehicle 10 and the launcher system 200 and transmitted to the display section 350.

In the above embodiments, an example that one flying object 205 is launched to one moving vehicle 10 has been shown but the present invention is not limited to this. For example, a plurality of flying objects 205 may be launched to one moving vehicle 10. In this case, at step S420 of FIG. 12D, the moving vehicle 10 is excluded from the assignment object when the number of flying objects 205 launched for the moving vehicle 10 reaches a predetermined number. In other words, when the five flying objects 205 are launched for one moving vehicle 10, the moving vehicle 10 is occluded from the assignment object if the number of flying objects 205 launched for the moving vehicle 10 reaches 5.

In the above embodiments, an example that the launching timing of the flying object 205 is determined by calculating the launching position by the launcher system 200 has been shown but the present invention is not limited to this. If the flying object 205 launched from the launcher system 200 meets the moving vehicle 10 at the meeting point 522, an optional method can be selected. For example, a time period is calculated from the time of launching to the time when the flying object 205 launched from the launcher system 200 reaches the meeting point 522. Next, a time is calculated which is necessary for the moving vehicle 10 to reach the meeting point 522 from a current position. When the time necessary for the flying object 205 to reach the meeting point 522 is shorter than the time necessary for the moving vehicle 10 to reach the meeting point 522, the flying object 205 may be launched.

In the above embodiments, an example that the launcher system 200 calculates the launching timing of the flying object 205 has been shown but the present invention is not limited to this. For example, the assigning section 330 may instruct the launching timing of the flying object 205 to the launcher system 200. The assigning section 330 calculates the launching point 512. Therefore, when the moving vehicle 10 reaches the launching point 512, the assigning section 330 may output an instruction signal of the flying object 205 to the launcher system 200.

In the above embodiment, an example has been shown in which the assignment policy is selected or manually specified in order to assign the moving vehicle 10 to the launcher system 200. However, both may be combined. For example, the launcher system 200 may be changed so that an assignment policy different from the assignment policy under execution is selected and then the moving vehicle 10 is assigned manually. In this case, the input section 360 transmits the result of change of the launcher system 200 assigned with the moving vehicle 10 to the assigning section 330 as the assignment change signal. Also, a policy change signal 362 may be contained in the assignment signal so as to change only the assignment policy.

In the above embodiment, various kinds of signals such as the detection signal, the assignment signal, the performance signal, the position signal are transmitted and received by using radio wave out a communication method is not limited to this. It is sufficient for the signal to be transmitted and received. Various types of transmission and reception means can be used. For example, the signals may be transmitted and received by wire.

In the second embodiment, an example in which a time is specified by using the setting slider 810 has been shown, but the present invention is not limited to this. It is sufficient to be able to specify a time, and any option may be selected. For example, the buttons showing 1 minute, 2 minutes, and 3 minutes and so on may be used.

In the above embodiments, an example in which the target assignment system 1 is provided with one sensor system 100 but the example is not limited to this. A plurality of sensor systems 100 may be provided. Also, if the command system 300 can acquire the position data of the moving vehicle 10 from outside the target assignment system 1, the sensor system 100 may be not provided for the command system 300.

The processing described, above is an example and the order, and the processing contents of each step in a range which does not obstruct functions may be changed. Also, the configuration may be changed optionally in the range which does not obstruct the functions.

What is claimed is:

1. A target assignment system comprising:
   a sensor system configured to detect a position of a moving vehicle to generate a detection signal;
   an assigning section configured to determine a first launcher system assigned with the moving vehicle in response to the detection signal, and generate a first display signal showing the moving vehicle and the first launcher system;
   a display section configured to display the moving vehicle and the first launcher system in real time in response to the first display signal; and
   an input section configured to generate an assignment change signal to instruct a change from the first launcher system,
   wherein the assigning section generates a second display signal in which the first launcher system is changed to a second launcher system, in response to the assignment change signal.

2. The target assignment system according to claim 1, further comprising:
   a policy managing section having a first assignment policy by which the moving vehicle is assigned to the first launcher system and a second assignment policy by which the moving vehicle is assigned to the second launcher system,
   wherein the assigning section acquires the first assignment policy from the policy managing section and generates the first display signal in response to the detection signal, and
   wherein the input section generates the assignment change signal when the second assignment policy is selected.

3. The target assignment system according to claim 2, wherein the input section generates the display change signal when an instruction is inputted such that the display section displays based on the second assignment policy, and
   wherein the assigning section generates a second display signal when the first launcher system is changed to the second launcher system in response to the display change signal.

4. The target assignment system according to claim 3, further comprising:
   a predicting section configured to predict a position of the moving vehicle after a predetermined time passes from reception of the detection signal, and generate a third display signal containing the predicted position of the moving vehicle.

5. The target assignment system according to claim 4, wherein the predicting section predicts a position of a flying object launched from the first launcher system or the second launcher system in response to the first display signal or the second display signal, and adds the predicted position of the flying object to the third display signal, and
   wherein the display section displays the predicted position of the flying object in response to the third display signal.

6. The target assignment system according to claim 1, wherein the input section generates the assignment change signal in response to an instruction to assign the moving vehicle to the second launcher system.

7. The target assignment system according to claim 1, wherein the sensor system calculates a moving direction and moving speed of the moving vehicle in response to a change of the position of the moving vehicle,
   wherein the assigning section calculates a meeting point and meeting time of the moving vehicle and a flying object launched for the moving vehicle from the first launcher system or the second launcher system based on the moving direction and moving speed of the moving vehicle, and generates the first or second display signal to contain the meeting point and the meeting time, and
   wherein the display section displays the meeting position and the meeting time in response to the first display signal or the second display signal.

8. The target assignment system according to claim 7, wherein the assigning section holds historical interception records, calculates an interception rate at the meeting point based on the historical interception records, and generates the first display signal or the second display signal to contain the interception rate, and
   wherein the display section displays the interception rate in response to the first display signal or the second display signal.

9. The target, assignment system according to claim 7, wherein the assigning section calculates the position of the moving vehicle as a launching position at a time when the flying object is launched based on the moving direction and moving speed of the moving vehicle, and generates the first display signal or the second display signal to contain the launching position, and
   wherein the display section displays the launching position in response to the first display signal or the second display signal.

10. The target assignment system according to claim 1, comprising:
    a sensor system; and
    a command system having the assigning section.

11. A target assignment method comprising:
    determining a first launcher system assigned with a moving vehicle in response to a detection signal which contains a detected position of the moving vehicle by a sensor system;
    generating a first display signal showing the moving vehicle and the first launcher system;
    displaying the moving vehicle and the first launcher system in real time in response to the first display signal; and
    generating a second display signal in which the first launcher system is changed to a second launcher system in response to an assignment change signal.

12. A non-transitory computer-readable recording medium which stores a program, which is executed by a computer, to realize a target assignment method comprising:
    determining a first launcher system assigned with a moving vehicle in response to a detection signal which contains a detected position of the moving vehicle by a sensor system;
    generating a first display signal showing the moving vehicle and the first launcher system;
    displaying the moving vehicle and the first launcher system in real time in response to the first display signal; and
    generating a second display signal in which the first launcher system is changed to a second launcher system in response to an assignment change signal.

* * * * *